(12) United States Patent
Wang et al.

(10) Patent No.: US 7,711,989 B2
(45) Date of Patent: May 4, 2010

(54) STORAGE SYSTEM WITH AUTOMATIC REDUNDANT CODE COMPONENT FAILURE DETECTION, NOTIFICATION, AND REPAIR

(75) Inventors: Yuanru Frank Wang, Broomfield, CO (US); Dwight Oliver Lintz, Jr., Lyons, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 445 days.

(21) Appl. No.: 11/279,376

(22) Filed: Apr. 11, 2006

(65) Prior Publication Data

US 2006/0236198 A1 Oct. 19, 2006

Related U.S. Application Data

(63) Continuation-in-part of application No. 11/140,106, filed on May 27, 2005.

(60) Provisional application No. 60/694,444, filed on Jun. 27, 2005, provisional application No. 60/667,861, filed on Apr. 1, 2005.

(51) Int. Cl.
G06F 11/07 (2006.01)
(52) U.S. Cl. .................................. 714/36; 713/1; 713/2
(58) Field of Classification Search .............. 714/6, 714/758, 15, 36; 713/1, 2
See application file for complete search history.

(56) References Cited

U.S. PATENT DOCUMENTS

| | | | |
|---|---|---|---|
| 5,568,641 A | 10/1996 | Nelson et al. | |
| 5,812,857 A | 9/1998 | Nelson et al. | |
| 5,937,198 A | 8/1999 | Nelson et al. | |
| 5,968,141 A | 10/1999 | Tsai | |
| 6,009,524 A | 12/1999 | Olarig et al. | |
| 6,018,806 A | 1/2000 | Cortopassi et al. | |
| 6,085,318 A * | 7/2000 | Vander Kamp et al. | 713/1 |
| 6,185,696 B1 | 2/2001 | Noll | |
| 6,275,931 B1 | 8/2001 | Narayanaswamy et al. | |
| 6,279,153 B1 | 8/2001 | Bi et al. | |
| 6,308,265 B1 | 10/2001 | Miller | |
| 6,317,827 B1 | 11/2001 | Cooper | |
| 6,341,239 B1 * | 1/2002 | Hayashi et al. | 700/79 |
| 6,363,463 B1 | 3/2002 | Mattison | |
| 6,421,792 B1 | 7/2002 | Cromer et al. | |
| 6,463,559 B1 * | 10/2002 | Murphy | 714/724 |
| 6,473,899 B1 | 10/2002 | Nelson et al. | |
| 6,487,680 B1 * | 11/2002 | Skazinski et al. | 714/23 |

(Continued)

*Primary Examiner*—Scott T Baderman
*Assistant Examiner*—Chae Ko
(74) *Attorney, Agent, or Firm*—Thomas J. Lavan; E. Alan Davis

(57) ABSTRACT

A RAID system includes a non-volatile memory storing a first program and first and second copies of a second program, and a processor executing the first program. The first program detects the first copy of the second program is failed and repairs the failed first copy in the non-volatile memory using the second copy. The failures may be detected at boot time or during normal operation of the controller. In one embodiment, the failure is detected via a CRC check. In one embodiment, the controller repairs the failed copy by copying the good copy to the location of the failed copy. In one embodiment, the system includes multiple controllers, each having its own processor and non-volatile memory and program that detects and repairs failed program copies. The programs include a loader, an application, FPGA code, CPLD code, and a program for execution by a power supply microcontroller.

55 Claims, 15 Drawing Sheets

U.S. PATENT DOCUMENTS

| | | |
|---|---|---|
| 6,542,981 B1 | 4/2003 | Zaidi et al. |
| 6,587,966 B1 * | 7/2003 | Chaiken et al. ............... 714/34 |
| 6,651,188 B2 | 11/2003 | Harding et al. |
| 6,665,813 B1 * | 12/2003 | Forsman et al. ............... 714/15 |
| 6,711,690 B2 | 3/2004 | Dayan et al. |
| 6,757,838 B1 | 6/2004 | Chaiken et al. |
| 6,792,556 B1 * | 9/2004 | Dennis ........................ 714/6 |
| 6,892,323 B2 | 5/2005 | Lin |
| 7,010,679 B2 | 3/2006 | Yang |
| 7,024,550 B2 | 4/2006 | Collins et al. |
| 7,069,431 B2 | 6/2006 | Dayan et al. |
| 7,073,053 B1 | 7/2006 | Oz et al. |
| 7,143,275 B2 * | 11/2006 | Cepulis et al. ................ 713/1 |
| 7,219,257 B1 * | 5/2007 | Mahmoud et al. ............. 714/6 |
| 7,222,257 B1 * | 5/2007 | Dibb ........................... 714/6 |
| 7,330,997 B1 * | 2/2008 | Odom .......................... 714/6 |
| 7,356,727 B1 * | 4/2008 | McGhee et al. ............... 714/2 |
| 7,363,520 B1 * | 4/2008 | Maier et al. ................. 713/300 |
| 7,467,165 B2 * | 12/2008 | Okada et al. ................. 707/202 |
| 2001/0011347 A1 | 8/2001 | Narayanaswamy et al. |
| 2002/0007469 A1 * | 1/2002 | Taketa et al. .................... 714/6 |
| 2002/0099976 A1 * | 7/2002 | Sanders et al. ............... 714/23 |
| 2002/0118243 A1 | 8/2002 | Forman |
| 2002/0178351 A1 * | 11/2002 | Ott ................................ 713/2 |
| 2002/0188886 A1 * | 12/2002 | Liu et al. ....................... 714/6 |
| 2003/0126315 A1 * | 7/2003 | Tan et al. ...................... 710/1 |
| 2003/0154471 A1 | 8/2003 | Teachman et al. |
| 2004/0025002 A1 * | 2/2004 | Cepulis et al. ................. 713/2 |
| 2004/0059958 A1 * | 3/2004 | Umberger et al. ............. 714/5 |
| 2004/0078119 A1 | 4/2004 | Luitje et al. |
| 2004/0088608 A1 * | 5/2004 | Nguyen et al. ............... 714/49 |
| 2004/0098712 A1 | 5/2004 | Pisupati et al. |
| 2004/0133752 A1 * | 7/2004 | Suzuki et al. ............... 711/153 |
| 2004/0153724 A1 * | 8/2004 | Nicholson et al. .............. 714/6 |
| 2004/0162977 A1 * | 8/2004 | King et al. ..................... 713/2 |
| 2005/0015649 A1 * | 1/2005 | Lee et al. ....................... 714/5 |
| 2005/0188257 A1 * | 8/2005 | Morita ......................... 714/13 |
| 2005/0283648 A1 * | 12/2005 | Ashmore ....................... 714/5 |
| 2006/0015771 A1 * | 1/2006 | Van Gundy et al. ............ 714/7 |
| 2006/0020844 A1 * | 1/2006 | Gibbons et al. ................ 714/2 |
| 2006/0083102 A1 * | 4/2006 | Ghanem et al. ............. 365/232 |

* cited by examiner

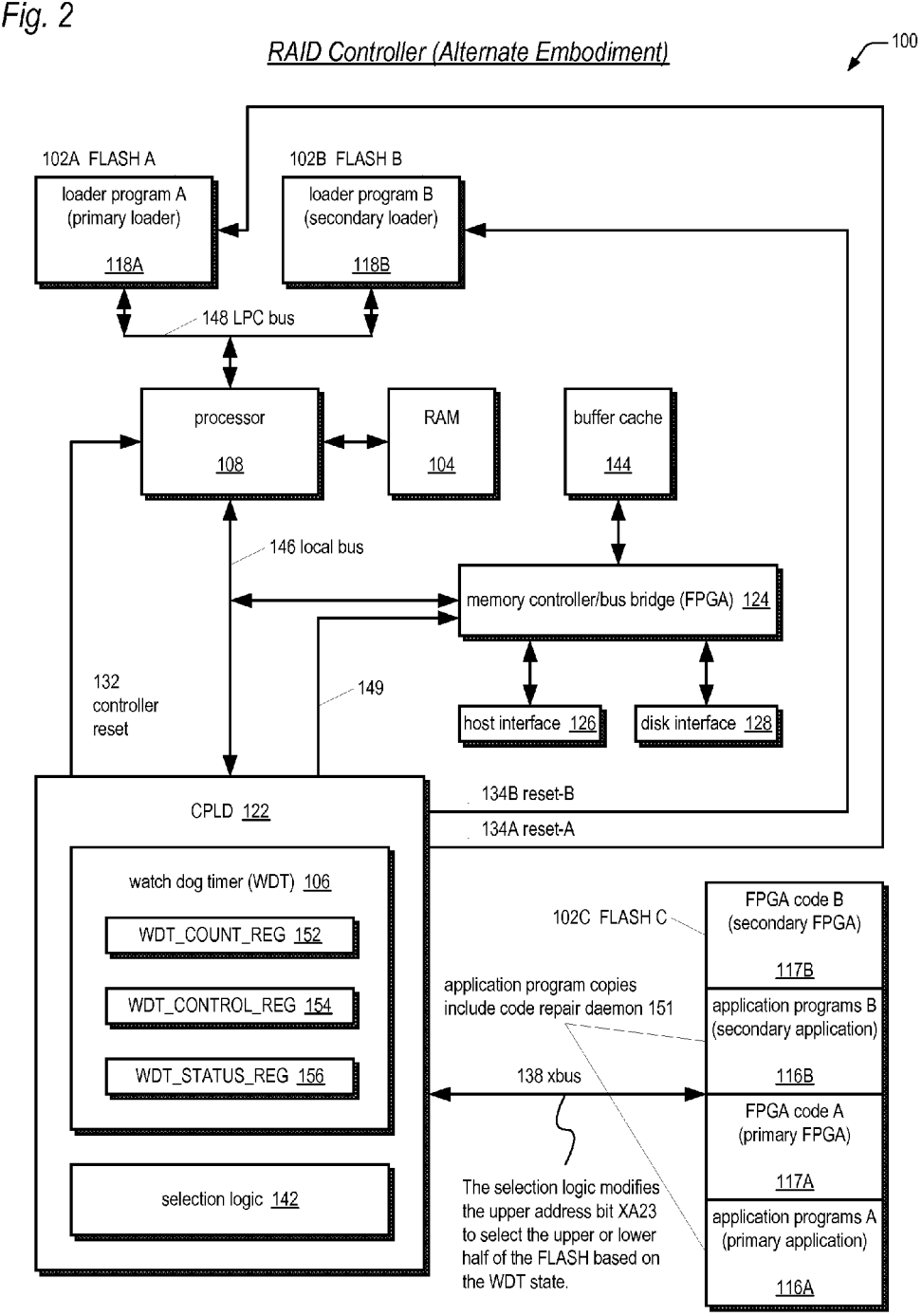

Fig. 3A
WDT COUNT REG — 152

| Bits | Name | Description | Default |
|---|---|---|---|
| 5:0 | COUNT | This is the count for WDT. The CPLD counts up from zero in a separate internal register each clock tick, which is 62.5 ms. If the internal register value reaches the COUNT and the ENABLE bit in the WDT_CONTROL_REG is set, the WDT has expired. In response, the CPLD will:<br>1) update the WDT_STATUS_REG bits appropriately to indicate the boot failure, and<br>2) re-load COUNT with the default value,<br>3) reset the WDT_CONTROL_REG to its default values indicated below, which causes the WDT to be re-enabled to begin monitoring the next loader boot, and<br>4) generate a true value on the controller reset signal.<br>SW may set the COUNT before enabling the WDT. For example, the loader may set the COUNT and enable the WDT just prior to jumping to the application. | 0x3F |
| 7:6 | | Reserved | 00 |

Fig. 3B
WDT CONTROL REG — 154

| Bit | Name | Description | Default |
|---|---|---|---|
| 0 | ENABLE | The CPLD sets this bit on any reset to enable the WDT to begin running.<br>SW may set this bit to enable the WDT.<br>SW may clear this bit to disable the WDT. | 1 |
| 1 | CLEAR_CNT | SW may set this bit to clear the COUNT in the CPLD internal register that is compared with the COUNT value. After setting the COUNT in the WDT_COUNT_REG, the loader simultaneously writes a 1 to the CLEAR_CNT bit, a 1 to the ENABLE bit, and a 0 to the LDR_WDT bit to disable the WDT from monitoring a loader boot and to begin monitoring an application boot.<br>SW may check this bit after setting it to see when the The CPLD has completed the operation.<br>The CPLD clears this bit to indicate the operation is complete. | 0 |
| 2 | LDR_WDT | When set, this bit indicates the WDT is being used to monitor a loader boot attempt.<br>When clear, this bit indicates the WDT is being used to monitor an application boot attempt.<br>The CPLD sets this bit on any reset, including any WDT timer reset.<br>SW may clear this bit to indicate the WDT is being used to monitor an application boot attempt. | 1 |
| 3 | LDR_PRI_ACCESS | This bit is used to program FLASH A and FLASH B and is only present in the embodiment of Figure 2.<br>SW sets this bit (and clears LDR_PRI_FAIL) to indicate that FLASH A is being accessed.<br>SW clears this bit to indicate that FLASH B is being accessed. | 1 |
| 4 | PRI_ACCESS | This bit has effect only if DRAM_WDT is set.<br>SW sets this bit to cause the selection logic to access the upper half of the FLASH when DRAM_WDT is set.<br>SW clears this bit to cause the selection logic to access the lower half of the FLASH when DRAM_WDT is set. | 1 |
| 5 | OVERRIDE_PRI_ACCESS | SW sets this bit to negate the effect of the PRI_ACCESS bit. That is, if OVERRIDE_PRI_ACCESS is set, the selection logic passes through to the high order FLASH address bit the corresponding processor address bit rather than using the relevant WDT state to determine the value of the upper FLASH address bit. | 0 |
| 6 | USE_SEC | SW sets this bit to indicate a user has requested the secondary application be booted first.<br>This bit retains its value after a WDT timeout reset. | 0 |
| 7 | DRAM_WDT | When clear, this bit indicates that when the microprocessor accesses the FLASH it is accessing loader code. Consequently, the selection logic uses the LDR_PRI_FAIL bit to determine whether to access the upper or lower half of the FLASH.<br>When set, this bit indicates that when the microprocessor accesses the FLASH it is accessing application code. Consequently, the selection logic uses the PRI_ACCESS bit to determine whether to access the upper or lower half of the FLASH.<br>The CPLD clears this bit on any reset, including any WDT timeout reset.<br>SW may set this bit to cause the selection logic to access the appropriate application code in FLASH based on the boot failure history.<br>Thus, if:<br>(DRAM_WDT == 0) AND (LDR_WDT == 1) ==> Loader is running out of FLASH (default)<br>(DRAM_WDT == 1) AND (LDR_WDT == 1) ==> Loader is running out of RAM<br>(DRAM_WDT == 1) AND (LDR_WDT == 0) ==> Application is running out of RAM | 0 |

Fig. 3C

WDT_STATUS_REG 156

| | | |
|---|---|---|
| 0 | LDR_PRI_FAIL | When set, this bit indicates the most recent previous attempt to boot the primary loader failed; when cleared, indicates the most recent previous attempt to boot any loader copy was not a failure of the primary loader.<br>The CPLD sets this bit if the WDT expires during a primary loader boot-up.<br>The CPLD clears this bit if the WDT expires during a secondary loader boot-up.<br>A primary loader boot-up is indicated by (LDR_PRI_FAIL == 0) AND (LDR_WDT == 1).<br>A secondary loader boot-up is indicated by (LDR_PRI_FAIL == 1) AND (LDR_SEC_FAIL == 0) AND (LDR_WDT == 1).<br>SW may clear this bit, such as after reloading the primary loader code into the FLASH. |
| 1 | LDR_SEC_FAIL | When set, this bit indicates the most recent previous attempt to boot the secondary loader failed; when cleared, indicates the most recent previous attempt to boot any loader copy was not a failure of the secondary loader.<br>The CPLD sets this bit if the WDT expires during a secondary loader boot-up.<br>The CPLD clears this bit if the WDT expires during a primary loader boot-up.<br>SW may clear this bit, such as after reloading the secondary loader code into the FLASH. |
| 2 | APP_PRI_FAIL | When set, this bit indicates the most recent previous attempt to boot the primary application failed; when cleared, indicates the most recent previous attempt to boot any application copy was not a failure of the primary application.<br>The CPLD sets this bit if the WDT expires during a primary application boot-up.<br>The CPLD clears this bit if the WDT expires during a secondary application boot-up.<br>A primary application boot-up is indicated by (APP_PRI_FAIL == 0) AND (LDR_WDT == 0).<br>A secondary application boot-up is indicated by (APP_PRI_FAIL == 1) AND (APP_SEC_FAIL == 0) AND (LDR_WDT == 0).<br>SW may clear this bit, such as after reloading the primary application code into the FLASH. |
| 3 | APP_SEC_FAIL | When set, this bit indicates the most recent previous attempt to boot the secondary application failed; when cleared, indicates the most recent previous attempt to boot any application copy was not a failure of the secondary application.<br>The CPLD sets this bit if the WDT expires during a secondary application boot-up.<br>The CPLD clears this bit if the WDT expires during a primary application boot-up.<br>SW may clear this bit, such as after reloading the secondary application code into the FLASH. |
| 4 | LDR_PRI_PRE_FAIL | When set, this bit indicates one or more previous attempt to boot the primary loader failed; when cleared, indicates zero attempts (if LDR_PRI_FAIL == 0) to boot the primary loader have failed, or one attempt (if LDR_PRI_FAIL == 1) to boot the primary loader have failed.<br>The CPLD sets this bit if the LDR_PRI_FAIL bit is set and the WDT expires during a secondary loader boot-up. |
| 5 | LDR_SEC_PRE_FAIL | When set, this bit indicates one or more previous attempt to boot the secondary loader failed; when cleared, indicates zero attempts (if LDR_SEC_FAIL == 0) to boot the secondary loader have failed, or one attempt (if LDR_SEC_FAIL == 1) to boot the secondary loader have failed.<br>The CPLD sets this bit if the LDR_SEC_FAIL bit is set and the WDT expires during a primary loader boot-up. |
| 6 | APP_PRI_PRE_FAIL | When set, this bit indicates one or more previous attempt to boot the primary application failed; when cleared, indicates zero attempts (if APP_PRI_FAIL == 0) to boot the primary application have failed, or one attempt (if APP_ PRI_FAIL == 1) to boot the primary application has failed.<br>The CPLD sets this bit if the APP_PRI_FAIL bit is set and the WDT expires during a secondary application boot-up. |
| 7 | APP_SEC_PRE_FAIL | When set, this bit indicates one or more previous attempt to boot the secondary application failed; when cleared, indicates zero attempts (if APP_SEC_FAIL == 0) to boot the secondary application have failed, or one attempt (if APP_SEC_FAIL == 1) to boot the secondary application has failed.<br>The CPLD sets this bit if the APP_SEC_FAIL bit is set and the WDT expires during a primary application boot-up. |

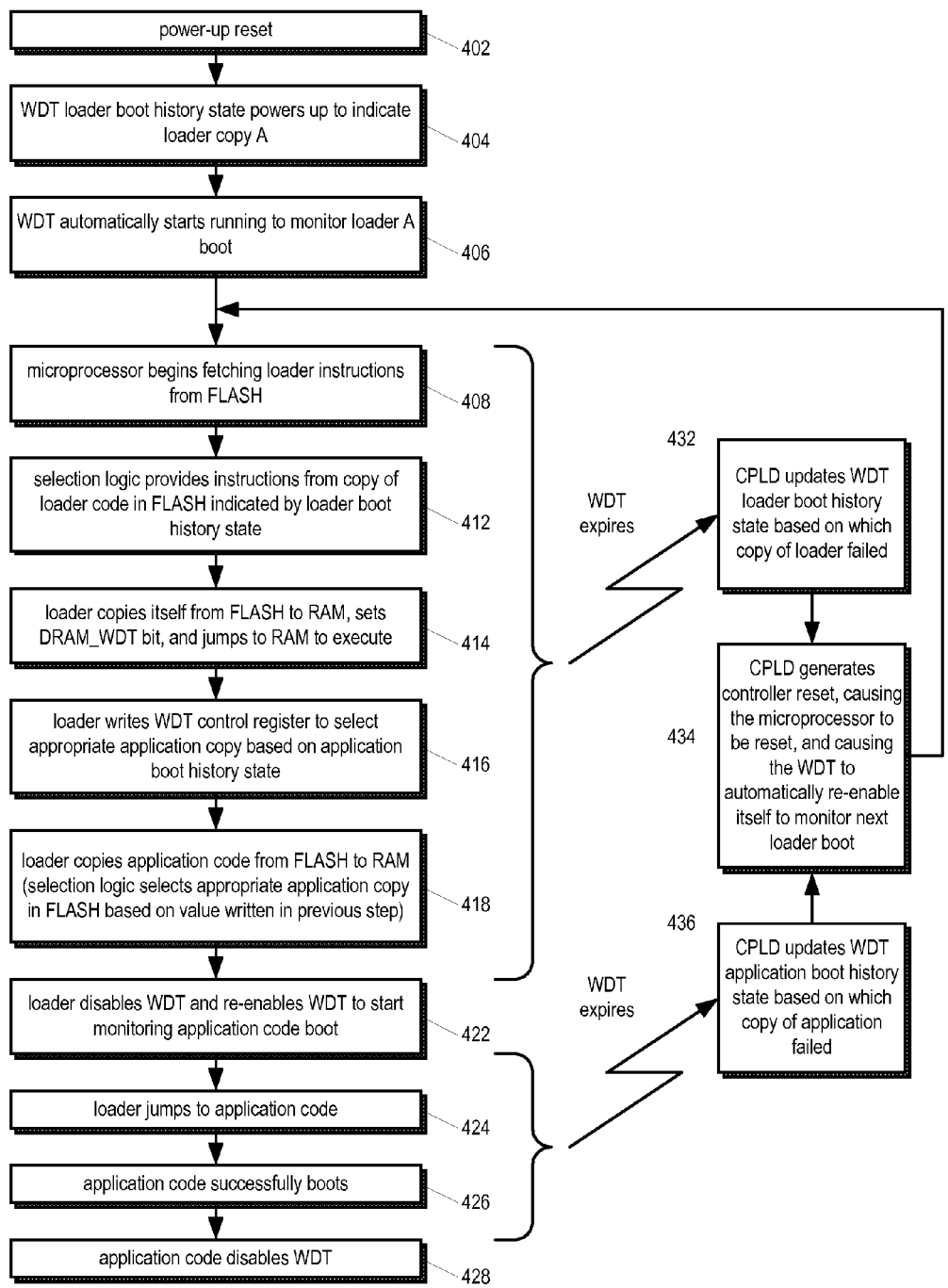

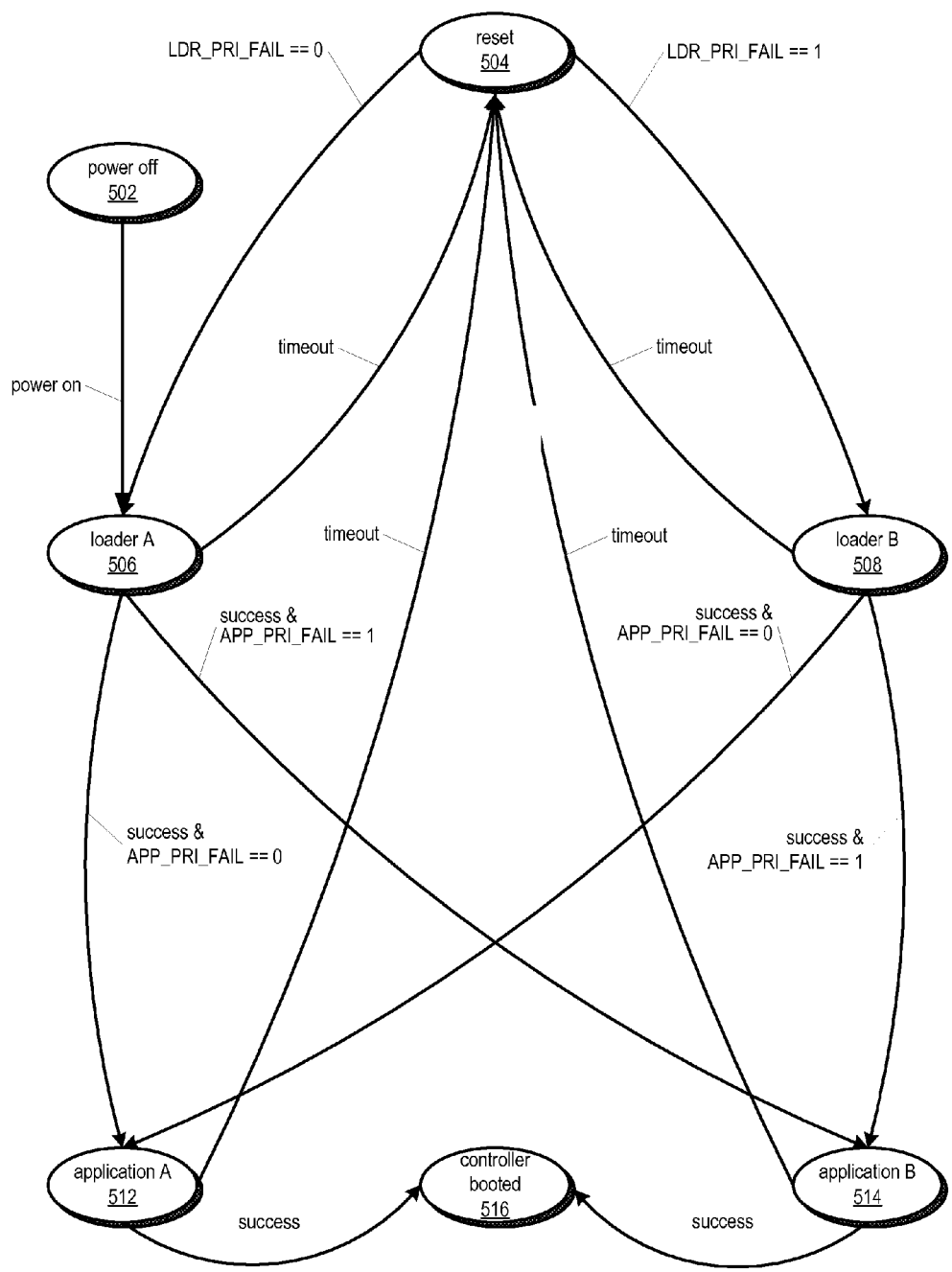

Fig. 7

Failure Counts

| RAID controller failure counts | management controller failure counts | enclosure controller failure counts |
|---|---|---|
| 702 loader primary | 702 loader primary | 702 loader primary |
| 704 loader primary previous | 704 loader primary previous | 704 loader primary previous |
| 706 loader secondary | 706 loader secondary | 706 loader secondary |
| 708 loader secondary previous | 708 loader secondary previous | 708 loader secondary previous |
| 712 application primary | 712 application primary | 712 application primary |
| 714 application primary previous | 714 application primary previous | 714 application primary previous |
| 716 application secondary | 716 application secondary | 716 application secondary |
| 718 application secondary previous | 718 application secondary previous | 718 application secondary previous |
| 722 FPGA primary | 726 CPLD primary | 732 power supply firmware primary |
| 724 FPGA secondary | 728 CPLD secondary | 734 power supply firmware secondary |
| 736 application RAM | 736 application RAM | 736 application RAM |
| 742 event logs | 742 event logs | 742 event logs |

Fig. 8

RAID System

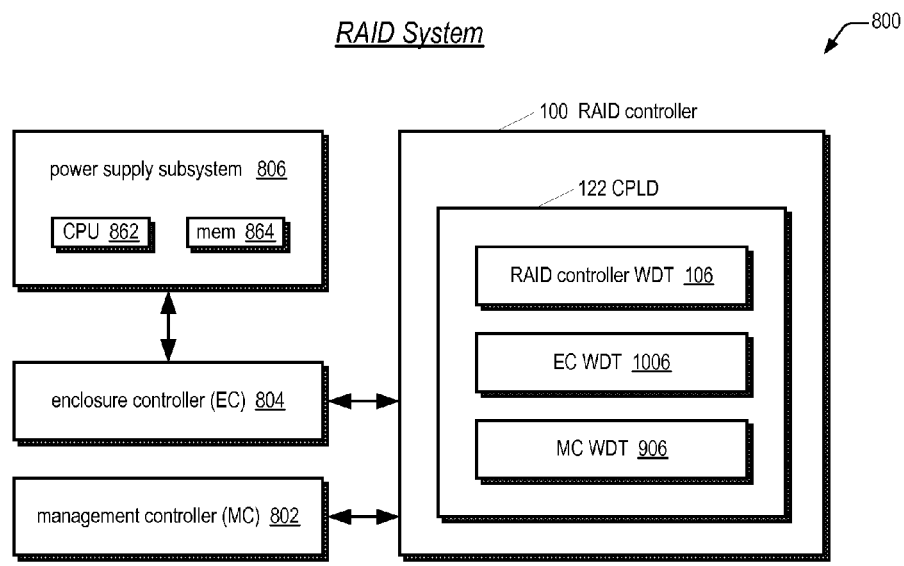

STORAGE SYSTEM WITH AUTOMATIC REDUNDANT CODE COMPONENT FAILURE DETECTION, NOTIFICATION, AND REPAIR

CROSS REFERENCE TO RELATED APPLICATION(S)

This application is a continuation-in-part of application Ser. No. 11/140,106 filed May 27, 2005, which is hereby incorporated by reference for all purposes, which claims the benefit of U.S. Provisional Application Ser. No. 60/667,861 filed Apr. 1, 2005, which is hereby incorporated by reference for all purposes.

This application claims the benefit of U.S. Provisional Application Ser. No. 60/694,444 filed Jun. 27, 2005, which is hereby incorporated by reference for all purposes.

FIELD OF THE INVENTION

The present invention relates in general to the field of storage controllers, and particularly to fault-tolerance of stored programs in storage controllers.

BACKGROUND OF THE INVENTION

Redundant Array of Inexpensive Disk (RAID) systems have become the predominant form of mass storage systems in most computer systems today that are used in applications that require high performance, large amounts of storage, and/or high data availability, such as transaction processing, banking, medical applications, database servers, internet servers, mail servers, scientific computing, and a host of other applications. A RAID controller controls a group of multiple physical disk drives in such a manner as to present a single logical disk drive (or multiple logical disk drives) to a computer operating system. RAID controllers employ the techniques of data striping and data redundancy to increase performance and data availability.

One aspect of high data availability involves reliable booting of the controller. Modern RAID controllers are intelligent controllers having microprocessors that execute stored programs that are often large and complex. For example, some of the stored programs include their own operating system. The programs are typically stored on the controller in some form of non-volatile memory, such as FLASH memory. However, execution of the programs from the FLASH memory is relatively slow. Consequently, controllers also include a volatile memory, such as random access memory (RAM), from which the microprocessor executes the programs during normal operation. When the controller is reset, the microprocessor begins fetching instructions of the stored programs from the FLASH memory. An initial portion of the stored programs, referred to as a loader program, copies the stored programs from the FLASH memory to the RAM and then executes a control transfer instruction to cause the microprocessor to execute the stored programs out of the RAM. The other stored programs may be commonly referred to as application programs. In some cases, the application programs are stored in the FLASH memory in a compressed format in order to reduce the required amount of FLASH memory, and the loader program decompresses the application programs as it copies them to RAM.

Modern FLASH memory devices have a sectored architecture. That is, the storage locations of the FLASH memory device are divided into sectors, each sector typically having a size between 8 KB and 128 KB. A characteristic of sectored FLASH memory devices is that one or more sectors of the device may be bad and other sectors may be good. Even a single bad sector may result in corruption of the stored programs such that the stored programs will fail to boot. For example, if a sector storing the loader program is bad (or the entire FLASH device is bad), then the loader program will fail to boot; in particular, the loader program will not load the application programs into RAM and transfer control thereto. Similarly, if a sector storing the application programs is bad (or the entire FLASH device is bad), then the application programs will fail to boot; in particular, although the loader program may load the application programs into RAM and transfer control thereto, the application programs will fail to operate the controller properly to transfer data between the host computer and the disk drives.

Bad FLASH memory sectors or entire bad FLASH memory devices may result during the manufacture of the FLASH memory device. Additionally, bad sectors may develop in the controller manufacturing process. Still further, bad sectors may develop in the field during use of the controller by the end user. For example, the user may instruct the controller to perform an upgrade of the stored programs, which involves burning, or programming, the FLASH memory with a new version of the stored programs. The typical process for programming a FLASH memory sector is to first erase the sector and then write to the erased sector. If a power loss or glitch occurs during the programming of the FLASH memory, then the particular sector being programmed during the power loss or glitch may be erased or only partially programmed. For another example, the circuitry used in the factory during the manufacturing process to burn the FLASH memory devices typically uses higher voltages than the circuitry on the controller to burn the FLASH memory device in the field. Consequently, the controller may fail to properly program in the field marginal sectors of the FLASH device that were correctly programmed when the controller was manufactured. Any of these types of bad sectors in the FLASH memory or an entire bad FLASH memory device may result in the controller failing to boot.

One solution to the problem of controllers failing to boot due to bad FLASH memory sectors or devices is to employ redundant controllers, such that if one controller fails to boot, the other controller performs the tasks of the failed controller. However, in some operating environments that do not require the high level of data availability that redundant controllers provide, the cost is too high; rather, a single controller is desirable in these environments. Furthermore, even in environments that are willing to incur the cost of multiple controllers, the controllers may be configured to operate independently in order to increase performance. Still further, even in a redundant controller configuration, it is unacceptable in certain mission-critical environments, such as video-on-demand or financial applications or medical applications, to have one of the redundant controllers failed for a prolonged period. Thus, in the above-mentioned scenarios, it is unacceptable for a controller to fail to boot due to a bad FLASH memory sector or device.

Therefore what is needed is a mechanism for improving the data availability characteristics of a RAID system by reducing the likelihood of a controller failure due to a failure of code in a FLASH memory sector or device.

BRIEF SUMMARY OF INVENTION

The present invention provides a RAID system that has redundant copies of its stored programs. If a controller of the system detects one copy of a program has failed, the controller repairs the failed copy from another good copy. At the end of a successful boot, the controller detects failures of the program copies that may have occurred during the boot sequence. The controller also detects failures in the program copies during normal operation of the controller. The system may include multiple controllers, each having its own processor and non-volatile memory for storing copies of the programs. The checked programs may include a boot loader, application programs, FPGA code, CPLD code, and power supply subsystem code. In one embodiment, the program that detects and repairs the failures runs as a background process. In one embodiment, the failure detection and repair program also checks for errors in the currently executing code that is running from RAM memory, rather than from non-volatile memory. In one embodiment, the failure detection and repair program performs a CRC check to detect failures, such as the code becoming corrupted or defective.

In one aspect, the present invention provides a RAID system. The system includes a non-volatile memory that stores a first program and first and second copies of a second program. The system also includes a processor, coupled to the non-volatile memory, that executes the first program. The first program detects the first copy of the second program is failed and repairs the failed first copy of the second program in the non-volatile memory using the second copy of the second program.

In another aspect, the present invention provides a method for improving the data availability characteristics of a RAID system. The method includes executing a first program on a processor of the RAID system. The method also includes the first program detecting that a first copy of a second program is failed. The first copy of the second program is stored in a non-volatile memory of the RAID system. The method also includes the first program repairing the failed first copy of the second program in the non-volatile memory using a second copy of the second program stored in the non-volatile memory.

In another aspect, the present invention provides a RAID system. The system includes first and second controllers. The first controller includes a first non-volatile memory that stores a first program and first and second copies of a second program, and a first processor, coupled to the first non-volatile memory, that executes the first program. The first program detects the first copy of the second program is failed and repairs the failed first copy of the second program in the first non-volatile memory using the second copy of the second program. The second controller is coupled to the first controller, and includes a second non-volatile memory that stores a third program and first and second copies of a fourth program, and a second processor, coupled to the second non-volatile memory, that executes the third program. The third program detects the first copy of the fourth program is failed and repairs the failed first copy of the fourth program in the second non-volatile memory using the second copy of the fourth program.

An advantage of the automatic detection and repair of failed copies of the programs is that it automatically maintains redundant copies of the programs to achieve fault-tolerance, thereby potentially reducing the likelihood that a controller will fail to boot by avoiding a situation in which all the copies of a program are bad. It also enables a user to replace a failing controller when necessary by warning the user of program copy failures.

BRIEF DESCRIPTION OF THE DRAWINGS

FIG. 2 is a block diagram illustrating a storage controller according to an alternate embodiment of the present invention.

FIG. 3 is a block diagram illustrating the registers of the watch dog timer of FIGS. 1 and 2 according to the present invention.

FIG. 4 is a flowchart illustrating operation of the controller of FIGS. 1 and 2 according to the present invention.

FIG. 5 is a state transition diagram illustrating operation of the controller of FIGS. 1 and 2 according to the present invention.

FIG. 7 is a block diagram illustrating failure counts and event logs maintained by the RAID system of FIG. 8 according to the present invention.

FIG. 8 is a block diagram illustrating a RAID system including the RAID controller of FIG. 1 according to the present invention.

DETAILED DESCRIPTION

Figure 1:
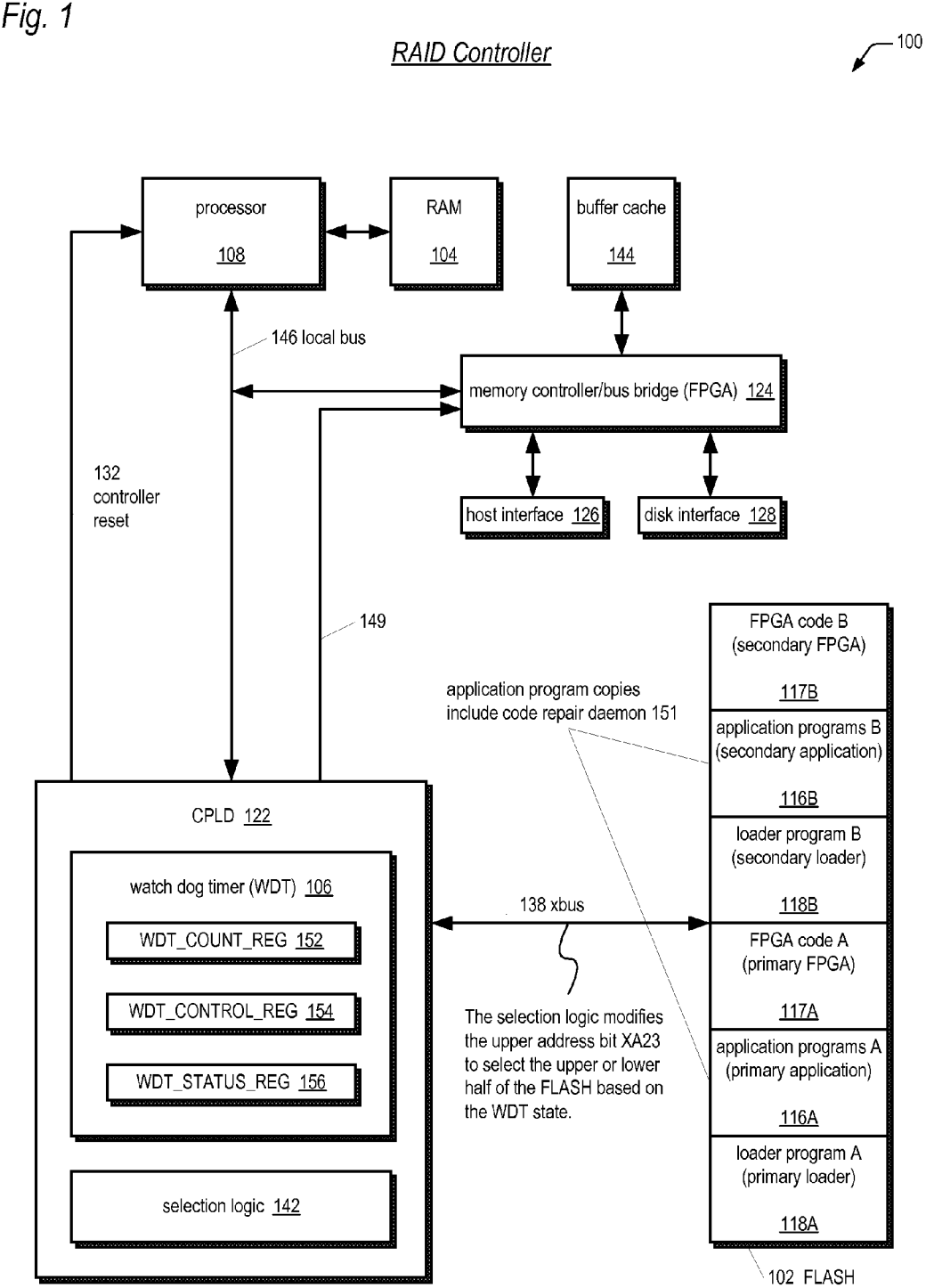
FIG. 1 is a block diagram illustrating a storage controller according to one embodiment of the present invention.
Figure 6A:
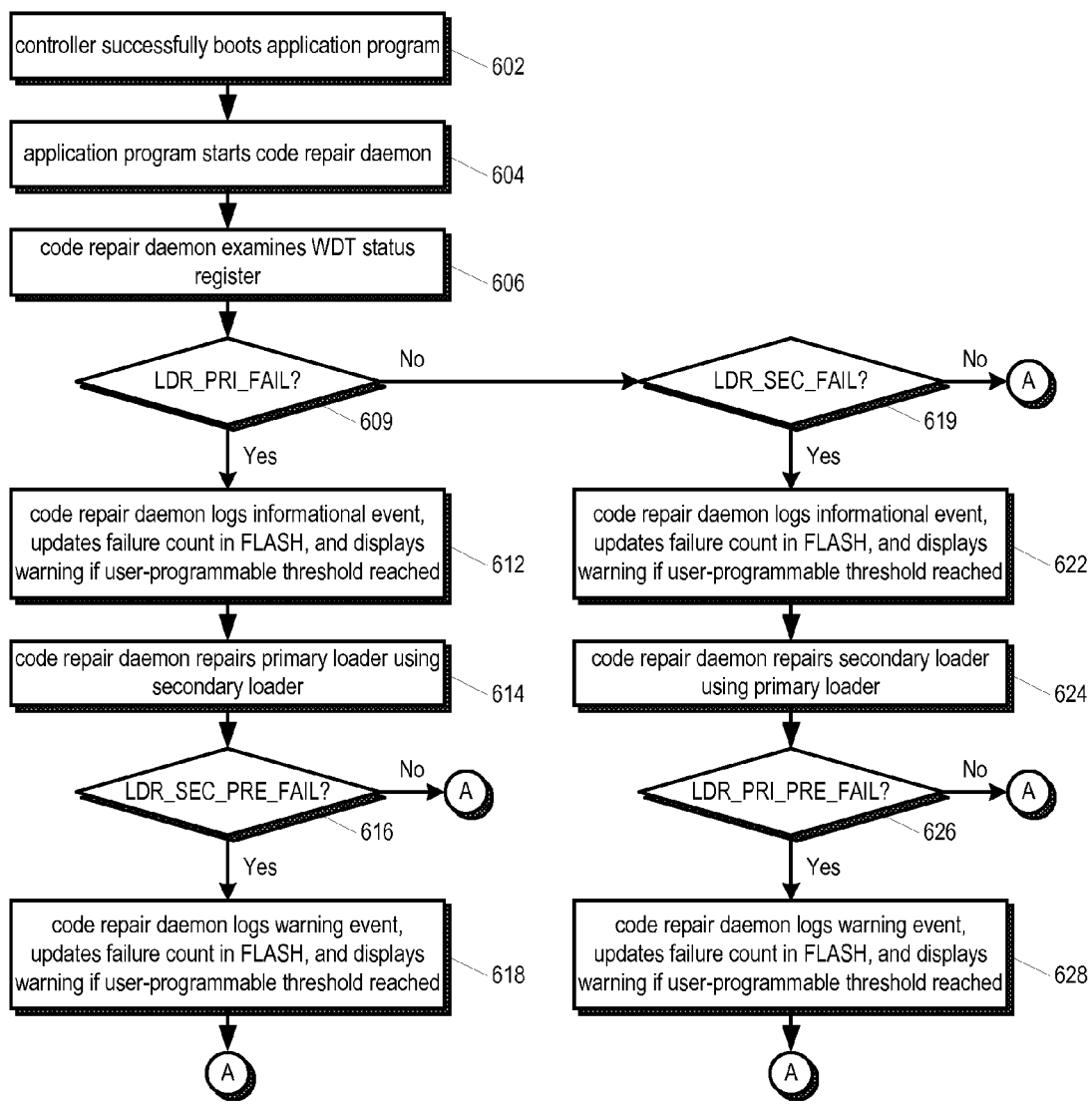
FIG. 6 is a flowchart illustrating operation of the controller of FIGS. 1 and 2 to detect, notify, and repair a failed copy of code according to the present invention.
Figure 6B:
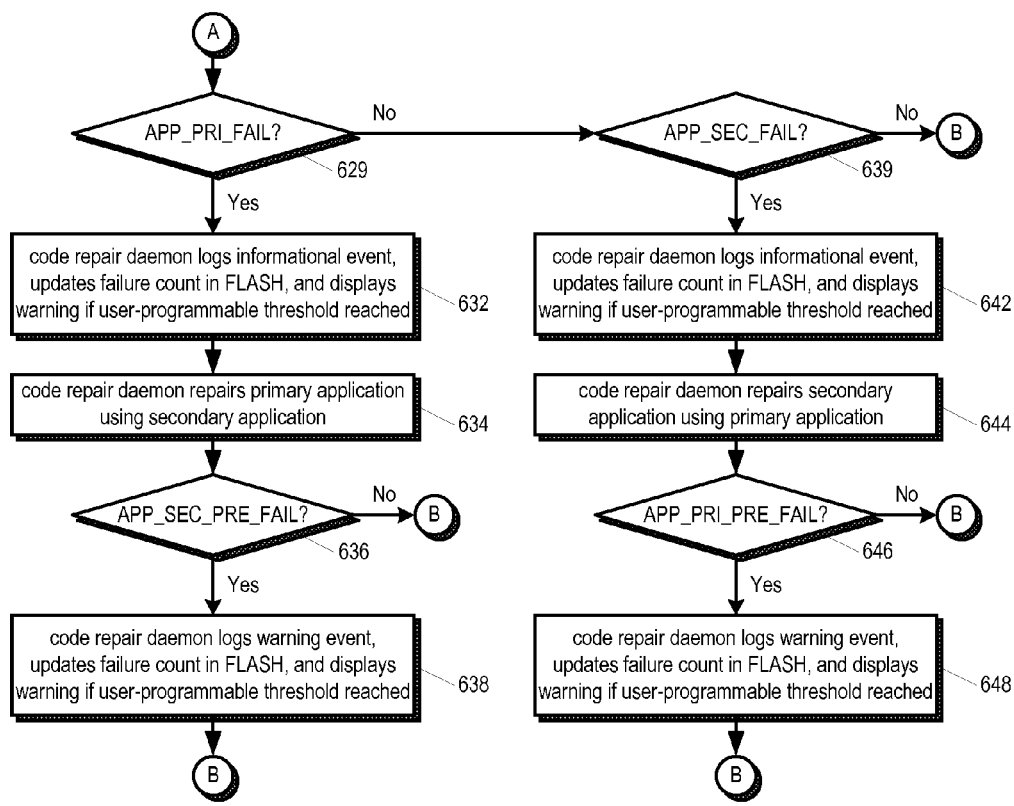
Figure 6C:
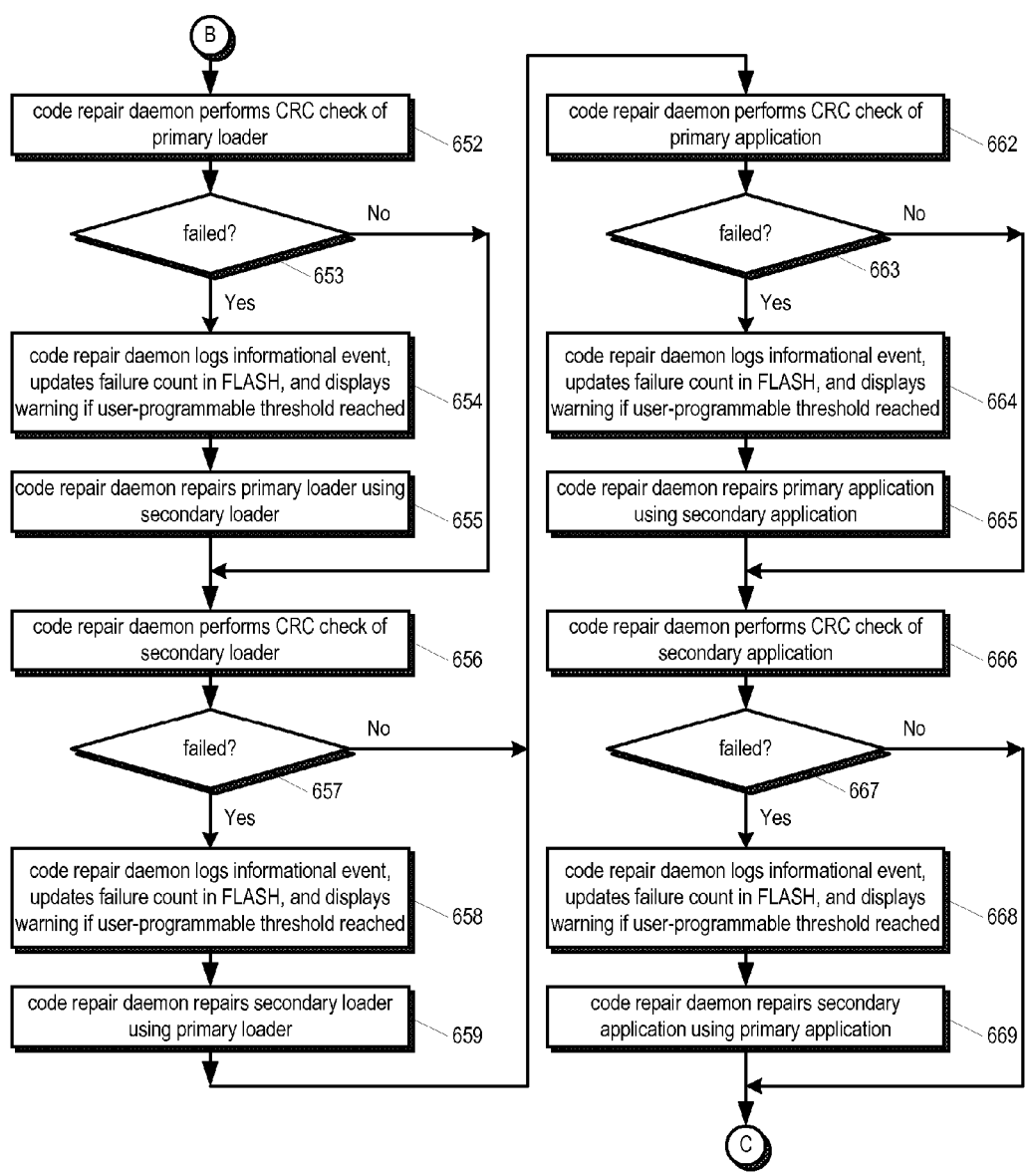
Figure 6D:
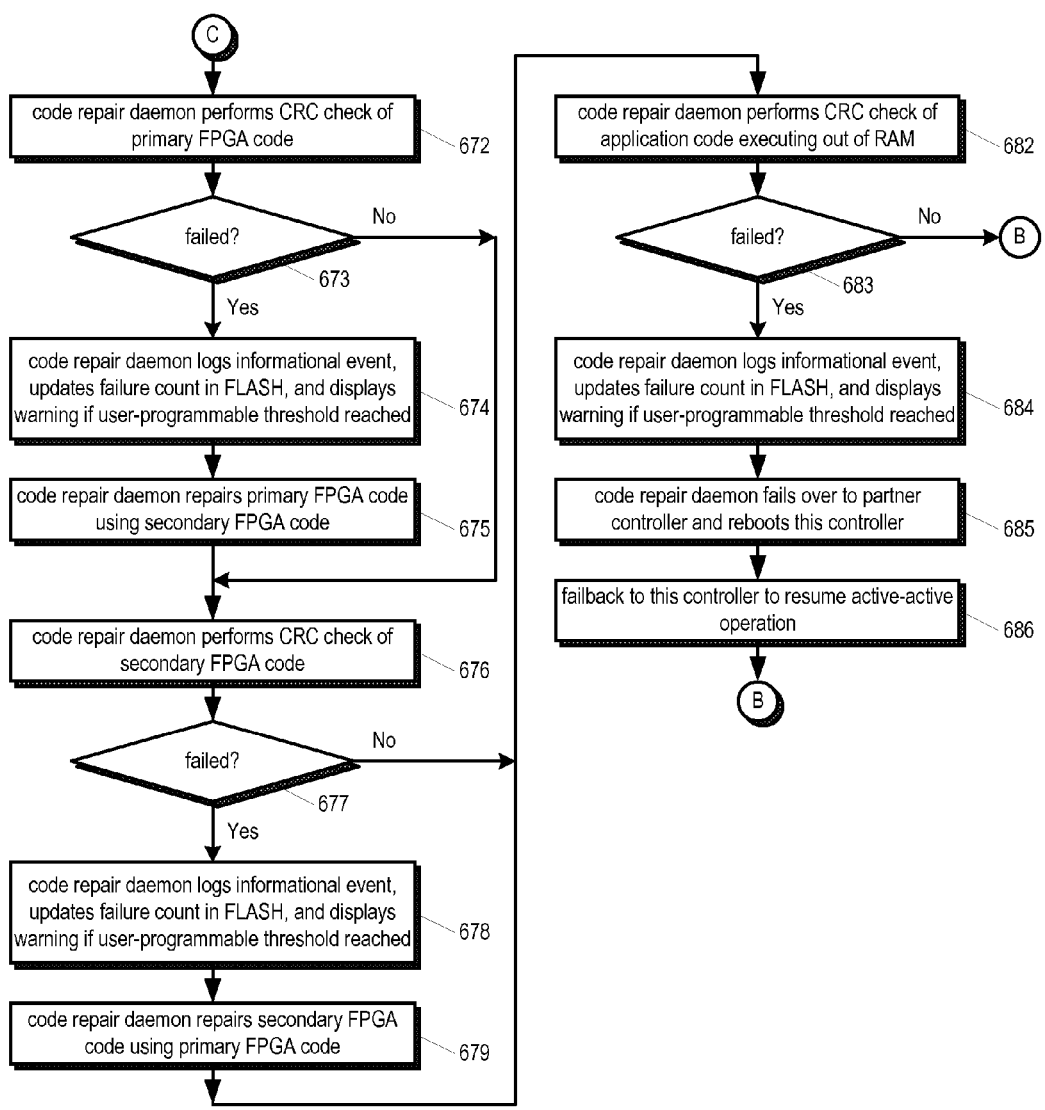

Referring now to FIG. 1, a block diagram illustrating a RAID controller 100 according to one embodiment of the present invention is shown. In one embodiment, the controller 100 may be one of a pair of active-active or active-passive redundant fault-tolerant RAID controllers for providing high data availability. In another embodiment, the controller 100 may be a single controller. Advantageously, in any system configuration, the controller 100 includes redundant copies of its stored programs and a mechanism for selectively attempting to boot different ones of the redundant copies until successfully booting as long as at least one copy is good. In one embodiment, the controller 100 includes a watch dog timer which automatically starts running each time the controller 100 attempts to boot a copy of the stored programs. If the timer expires, the timer resets the controller 100 after updating state used by selection logic to select another copy to attempt to boot. Additionally, advantageously, the controller 100 detects if one of the redundant copies of various code components is failed, and repairs the failed copy using a good copy of the failed code. The controller 100 detects a code copy failure both at boot time and also during normal operation of the controller 100.

The controller 100 includes a processor 108, or processor complex 108. Coupled to the processor 108 is random access memory (RAM) 104 from which the processor 108 executes stored programs. In particular, the controller 100 copies programs from a FLASH memory 102 to the RAM 104 for faster execution by the microprocessor 108, as described below. In one embodiment, the RAM 104 comprises a double-data-rate (DDR) RAM, and the processor 108 is coupled to the DDR RAM 104 via a DDR bus.

Also coupled to the processor 108 is a memory controller/bus bridge 124. In one embodiment, the processor 108 and memory controller/bus bridge 124 are coupled by a local bus 146, such as a PCI, PCI-X, or other PCI family local bus. Coupled to the memory controller/bus bridge 124 are a buffer cache memory 144, a host interface 126, and a disk interface 128. In one embodiment, the buffer cache 144 comprises a DDR RAM coupled to the memory controller/bus bridge 124 via a DDR bus. In one embodiment, the host interface 126 and disk interface 128 comprise PCI-X devices coupled to the memory controller/bus bridge 124 via respective PCI-X buses. The buffer cache 144 is used to buffer and cache user data as it is transferred between the host computers and the disk drives via the host interface 126 and disk interface 128, respectively.

The disk interface 128 interfaces the controller 100 to disk drives or other mass storage devices, including but not limited to, tape drives, solid-state disks (SSD), and optical storage devices, such as CDROM or DVD drives. The disk drives store user data. The disk interface 128 may include, but is not limited to, the following interfaces: Fibre Channel, Small Computer Systems Interface (SCSI), Advanced Technology Attachment (ATA), Serial Attached SCSI (SAS), Serial Advanced Technology Attachment (SATA), Ethernet, Infiniband, HIPPI, ESCON, or FICON. The controller 100 reads and writes data from or to the disk drives in response to I/O requests received from host computers.

The host interface 126 interfaces the controller 100 with host computers. In one embodiment, the controller 100 is a local bus-based controller, such as a controller that plugs into, or is integrated into, a local I/O bus of the host computer system, such as a PCI, PCI-X, CompactPCI, PCI-Express, PCI-X2, EISA, VESA, VME, RapidIO, AGP, ISA, 3GIO, HyperTransport, Futurebus, MultiBus, or any other local bus. In this type of embodiment, the host interface 126 comprises a local bus interface of the local bus type. In another embodiment, the controller 100 is a standalone controller in a separate enclosure from the host computers that issue I/O requests to the controller 100. For example, the controller 100 may be part of a storage area network (SAN). In this type of embodiment, the host interface 126 may comprise various interfaces such as Fibre Channel, Ethernet, InfiniBand, SCSI, HIPPI, Token Ring, Arcnet, FDDI, LocalTalk, ESCON, FICON, ATM, SAS, SATA, iSCSI, and the like.

The microprocessor 108 may be any processor capable of executing stored programs, including but not limited to, for example, a processor and chipset, such as an x86 architecture processor and what are commonly referred to as a North Bridge or Memory Control Hub (MCH) and a South Bridge or I/O Control Hub (ICH), which includes I/O bus interfaces, such as an interface to an ISA bus or a PCI-family bus. In one embodiment, the processor complex 108 comprises a Transmeta TM8800 processor that includes an integrated North Bridge and an ALi M1563S South Bridge. In another embodiment, the processor 108 comprises an Intel Celeron M processor and an MCH and ICH. In another embodiment, the processor 108 comprises an AMD Mobile Sempron processor with an integrated North Bridge and an Ali M1563S South Bridge.

The processor 108, host interface 126, and disk interface 128, read and write data from and to the buffer cache 144 via the memory controller/bus bridge 124. In one embodiment, the memory controller/bus bridge 124 is a field-programmable gate array (FPGA) that the processor 108 programs using FPGA code 117 stored in the FLASH memory 102, as discussed below, during initialization of the controller 100. The processor 108 executes application programs 116 stored in the FLASH memory 102 that control the transfer of data between the disk drives and the hosts. The processor 108 receives commands from the hosts to transfer data to or from the disk drives. In response, the processor 108 issues commands to the disk interface 128 to accomplish data transfers with the disk drives. Additionally, the processor 108 provides command completions to the hosts via the host interface 126. The processor 108 may also perform storage controller functions such as RAID control, logical block translation, buffer management, and data caching.

Also coupled to the local bus 146 is a complex programmable logic device (CPLD) 122. The CPLD 122 generates a controller reset signal 132 for resetting the controller 100. In particular, the controller reset signal 132 resets the processor 108 if the watch dog timer 106 expires to cause the processor 108 to begin fetching instructions from its reset vector location in the FLASH memory 102, as described below in detail. In one embodiment, the controller reset signal 132 resets the other circuits of the controller 100, including the CPLD 122; however, some of the bits of the registers of the CPLD 122 retain their value through the reset, as described below, particularly with respect to FIG. 3. The CPLD 122 includes a watch dog timer (WDT) 106 and selection logic 142, which are described in more detail below. Other embodiments are contemplated in which the functions of the CPLD 122 are performed by other circuits, such as a field-programmable gate array (FPGA) or other logic devices. In one embodiment, the CPLD 122 is programmed during the manufacture of the controller 100. Additionally, in one embodiment, the CPLD 122 may be re-programmed in the field using one of redundant copies of CPLD code stored in a non-volatile memory, as discussed below.

In one embodiment, the CPLD 122 and memory controller/bus bridge (FPGA) 124 are coupled by a bus 149 used for programming the FPGA 124. At boot time, the processor 108 reads the FPGA code 117 from the FLASH memory 102 and programs the memory controller/bus bridge 124 with the FPGA code 117 by writing the bytes of FPGA code 117 to a register of the CPLD 122, which the CPLD 122 forwards on the bus 149 to the FPGA 124. In one embodiment, the processor 108 programs the memory controller/bus bridge 124 with the FPGA code 117 at some point in the boot process prior to jumping to the application code at block 424 of FIG. 4.

The FLASH memory 102 is coupled to the CPLD 122 by an xbus 138. In one embodiment, the FLASH memory 102 is a 16 MB×8-bit FLASH memory device having 24 address bit inputs. The xbus 138 includes 24 address bits used to address the locations in the FLASH memory 102. In one embodiment, as described in detail below in Eq. (1) with respect to FIG. 3, the selection logic 142 selectively generates the upper xbus 138 address bit, bit 23 (referred to as XA23), to access the appropriate half of the FLASH memory 102 based on the watch dog timer 106 state.

The FLASH memory 102 stores one copy of a loader program, referred to as loader program A 118A, or primary loader 118A; a second copy of a loader program, referred to as loader program B 118B, or secondary loader 118B; one copy of an application program, referred to as application program A 116A, or primary application 116A; a second copy of the application program, referred to as application program B 116B, or secondary application 116B; one copy of code for programming the memory controller/bus bridge, which is a field-programmable gate array (FPGA), referred to as FPGA code A 117A, or primary FPGA code 117A; and a second copy of the code for programming the FPGA, referred to as FPGA code B 117B, or secondary FPGA code 117B. The primary and secondary loaders 118A/118B are referred to collectively as loaders 118 or loader programs 118. The primary and secondary applications 116A/116B are referred to collectively as applications 116 or application programs 116. The primary and secondary FPGA code 117A/117B are referred to collectively as FPGA code 117. The loaders 118, applications 116, and FPGA code 117 are referred to collectively as stored programs, programs, or code. In the embodiment of FIG. 1, the primary loader/application/FPGA code 118A/116A/117A are stored in the upper 8 MB address range of the FLASH memory 102, and the secondary loader/application/FPGA code 118B/116B/117B are stored in the lower 8 MB address range of the FLASH memory 102. In the embodiment of FIG. 1, if the OVERRIDE_PRI_ACCESS bit (of FIG. 3 below) is set such that the local bus 146 address bit 23 is passed through as xbus 138 address bit XA23, the primary loader/application/FPGA code 118A/116A/117A occupy the address range 0xFF800000 to 0xFFFFFFFF in the microprocessor 108 address space, and the secondary loader/application/FPGA code 118B/116B/117B occupy the address range 0xFF000000 to 0xFF7FFFFF in the microprocessor 108 address space.

The copies of the application code 116 each include a code repair daemon 151. As discussed below, the code repair daemon 151 detects failed copies of the loader, application, and/or FPGA code 118/116/117 and automatically repairs the failed copy using the remaining good copy.

It should be understood that the redundant copies of the loader program 118A/118B, the application program 116A/116B, and the FPGA code 117A/117B stored in the FLASH memory 102 may be different versions or revisions of the same program and are not necessarily mirror image copies. For example, it may be desirable when upgrading the stored programs in the controller 100 to burn the newer version of the program into only one copy in the FLASH memory 102 and to leave the older version of the program in the other copy in the FLASH memory 102. This may be particularly advantageous if the newer version of the program turns out to be non-operational in the user's particular configuration or to be less desirable for use by the user, because it would enable the user to configure the controller, such as via a management interface, to revert back to booting the older version of the program rather than the newer version. Thus, although the redundant copies of the programs may not be mirror image copies, they are still redundant because they perform essentially the same function, in particular such that if one copy of the program fails to boot, such as due to a bad FLASH sector or faulty programming, the other copy of the program may be successfully booted as long as the other copy does not have a fault that causes it to fail to boot.

The CPLD 122 watch dog timer 106 includes a WDT_COUNT register 152, a WDT_CONTROL register 154, and a WDT_STATUS register 156, described in detail in FIG. 3. The watch dog timer 106 provides state information, such as the values of bits in the WDT_CONTROL register 154 and WDT_STATUS register 156, to the selection logic 142. When the microprocessor 108 generates an address in the range of the FLASH memory 102, the selection logic 142 uses the watch dog timer 106 state information to select the appropriate copy of the programs 116A/116B/118A/118B stored in the FLASH memory 102 from which to provide instructions or data to the microprocessor 108, as described in detail below.

Referring now to FIG. 2, a block diagram illustrating a storage controller 100 according to an alternate embodiment of the present invention is shown. The controller 100 of FIG. 2 is similar to the controller 100 of FIG. 1, except the controller 100 of FIG. 2 includes three FLASH memory devices, referred to collectively as FLASH memories 102, rather than the single FLASH memory device 102 of FIG. 1. The three FLASH memory devices 102 of the controller 100 of FIG. 2 are referred to as FLASH memory A 102A, FLASH memory B 102B, and FLASH memory C 102C.

FLASH memory C 102C is coupled to the CPLD 122 via the xbus 138 similarly to the embodiment of FIG. 1; however, FLASH memory C 102C stores only the primary application 116A and the secondary application 116B and the primary FPGA code 117A and secondary FPGA code 117B. FLASH memory A 102A stores the primary loader 118A, and FLASH memory B 102B stores the secondary loader 118B. In one embodiment, each of the FLASH memory A 102A and FLASH memory B 102B devices comprises a 2 MB low pin count (LPC) FLASH memory device, that is coupled to the processor 108 via a common LPC bus 148 that is distinct from the xbus 138. In one embodiment, the LPC bus 148 comprises a 4-bit wide data bus.

FLASH memory A 102A and FLASH memory B 102B are coupled to the processor 108 via a shared bus and both receive on their chip select inputs the same chip select signal generated by the processor 108, which is different from the chip select the processor 108 generates to select FLASH memory C 102C; thus, FLASH memory A 102A and FLASH memory B 102B effectively occupy the same memory range within the processor 108 address space. The CPLD 122 generates a reset-A signal 134A and a reset-B signal 134B coupled to the reset input of FLASH memory A 102A and FLASH memory B 102B, respectively. The selection logic 142 always generates a true value on at least one of the reset-A 134A and reset-B 134B signals so that, although they effectively occupy the same memory range within the processor 108 address space, only one of the FLASH memory A 102A and FLASH memory B 102B devices responds on the shared bus to any given access by the processor 108. The selection logic 142 generates the reset-A 134A and reset-B 134B signals based on the state of the watch dog timer 106, as described in more detail below.

Referring now to FIG. 3, a block diagram illustrating the three registers 152/154/156 of the watch dog timer 106 of FIGS. 1 and 2 according to the present invention is shown. FIG. 3 includes FIG. 3A illustrating the WDT_COUNT_REG 152 of FIGS. 1 and 2, FIG. 3B illustrating the WDT_CONTROL_REG 154 of FIGS. 1 and 2, and FIG. 3C illustrating the WDT_STATUS_REG 156 of FIGS. 1 and 2. Each of the registers 152/154/156 is an 8-bit register, as shown. Each of the registers 152/154/156 is writeable and readable. FIG. 3 provides the bit number, name, and a description of the function of each bit of the three registers 152/154/156. The operation and use of the various bits of the registers will be described in detail with respect to FIG. 4 below.

The reset values of the WDT_COUNT_REG 152 and WDT_CONTROL_REG 154 are shown in the far right column of FIG. 3A and FIG. 3B, respectively. Either a power-up reset or a controller reset 132 causes the bits to have the reset values shown. The exception is the USE_SEC bit, which retains its value after a controller reset 132. Each of the bits in the WDT_STATUS_REG 156 powers up with a binary zero value. The bits of the WDT_STATUS_REG 156 retain their value through a controller reset 132 unless updated as described in FIG. 3C due to a timeout of the watch dog timer 106.

It is noted that upon reset of the CPLD 122, either in response to a power-up reset or via a controller reset 132 in response to the watch dog timer 106 expiring, the CPLD 122 hardware enables the watch dog timer 106 to commence running without any intervention from the programs executing on the processor 108. That is, the CPLD 122 enables the watch dog timer 106 to begin running to monitor the boot of the selected copy of the loader 118 before any instructions of the loader 118 are executed. Consequently, advantageously, even if the sector of the FLASH memory 102 that stores the initial portion of the loader 118 is bad such that no instructions of the loader 118 execute, the watch dog timer 106 will still expire to indicate a boot failure of the selected copy of the loader 118, and the CPLD 122 will responsively reset the processor 108 to attempt to boot the other copy of the loader 118.

The selection logic 142 of CPLD 122 of FIGS. 1 and 2 generates the upper xbus 138 address bit to the FLASH memory 102, denoted XA23, based on the state of bits in the WDT_CONTROL_REG 154 and WDT_STATUS_REG 156, as indicated by Eq. (1) here:

$$XA23 = \text{OVERRIDE\_PRI\_ACCESS?LA23:} \\ ((\text{DRAM\_WDT\&PRI\_ACCESS})| \\ (!\text{DRAM\_WDT\&!LDR\_PRI\_FAIL})) \quad \text{Eq. (1)}$$

In the equation above, LA23 denotes the corresponding local bus 146 address bit 23 generated by the processor 108, which the selection logic 142 passes through to XA23 if OVERRIDE_PRI_ACCESS is set. The loader 118 may set the OVERRIDE_PRI_ACCESS bit in order to upgrade the desired copy of the loader 118 or application program 116 in the FLASH memory 102. As shown in Eq. (1), if the OVERRIDE_PRI_ACCESS bit is clear, the selection logic 142 uses the LDR_PRI_FAIL bit to decide whether to select the upper or lower half of the FLASH memory 102 if the DRAM_WDT bit is clear, and uses the PRI_ACCESS bit if the DRAM_WDT bit is set.

With respect to the embodiment of FIG. 2, the selection logic 142 generates the reset-A 134A and reset-B 134B signals to FLASH memory A 102A and FLASH memory B 102B, respectively, based on the state of bits in the WDT_CONTROL_REG 154 and WDT_STATUS_REG 156, as indicated by equations (2) and (3) below:

$$\text{reset-B} = \text{LDR\_PRI\_ACCESS\&!LDR\_PRI\_FAIL} \quad \text{Eq. (2)}$$

$$\text{reset-A} = !\text{LDR\_PRI\_ACCESS|LDR\_PRI\_FAIL} \quad \text{Eq. (3)}$$

To program FLASH A 102A, the loader 118 sets the LDR_PRI_ACCESS bit and clears the LDR_PRI_FAIL bit. To program FLASH B 102B, the loader 118 clears the LDR_PRI_ACCESS bit.

In one embodiment, the loader 118 is configured to enter a user-interactive menu program to receive user input under certain conditions, such as when all copies of the loader 118 or application program 116 have failed to boot a predetermined number of times. In one embodiment, the predetermined number is two. When the loader 118 enters the user menu, the loader 118 clears the ENABLE bit to disable the watch dog timer 106. When the user exits the loader menu, the loader 118 re-enables the watch dog timer 106. The user may specify whether to attempt to load the primary or secondary copy of the application code first. If the user specifies the primary copy, then the loader 118 clears the USE_SEC bit; whereas, if the user specifies the secondary copy, then the loader 118 sets the USE_SEC bit. Therefore, the USE_SEC bit retains its value after a controller reset 132 to retain the user's preference.

Referring now to FIG. 4, a flowchart illustrating operation of the controller 100 of FIGS. 1 and 2 according to the present invention is shown. Flow begins at block 402.

At block 402, a power-up reset of the controller 100 occurs. Consequently, each of the devices of the controller 100 are reset, and in particular, the processor 108 is reset such that it begins fetching code from its reset vector, such as 0xFFFFFFF0 in the case of an x86 architecture processor. The reset at block 402 may also comprise a reset of the entire controller 100 received from a source external to the controller 100, such as a reset received from a host computer. Flow proceeds to block 404.

At block 404, the CPLD 122 register bits obtain their power-up values indicated in FIG. 3, in response to the reset of block 402. In particular, the LDR_WDT bit is set, the DRAM_WDT bit is clear, and the LDR_PRI_FAIL bit is clear, which indicates the watch dog timer 106 will be monitoring a boot of the primary loader 118A. Additionally, this state will cause the selection logic 142 to provide instructions to the processor 108 from the primary loader 118A in response to instruction fetches by the processor 108. In the embodiment of FIG. 1, the selection logic 142 will generate a binary one on the XA23 bit to cause the FLASH 102 to provide the primary loader 118A instructions; in the embodiment of FIG. 2, the selection logic 142 will generate a true value on the reset-B signal 134B and a false value on the reset-A signal 134A to cause the FLASH B 102B to be held in reset to enable the FLASH A 102A to provide the primary loader 118A instructions. Flow proceeds to block 406.

At block 406, the watch dog timer 106 automatically starts running to monitor the primary loader 118A boot. This is because the WDT_COUNT_REG 152 and WDT_CONTROL_REG 154 obtained their reset values in response to the reset at block 404, which includes a clear LDR_PRI_FAIL bit to indicate the primary loader 118A has not failed and a set LDR_WDT bit to indicate a loader 118 is booting. Flow proceeds to block 408.

At block 408, the processor 108 begins fetching instructions from its reset vector address, which is in the FLASH memory 102 range of FIG. 1 and in the shared FLASH memory A 102A and FLASH memory B 102B range of FIG. 2. Flow proceeds to block 412.

At block 412, the selection logic 142 provides the instructions from one of the primary loader 118A and secondary loader 118B indicated by the watch dog timer 106 loader 118 boot history state, and in particular, based on the value of the LDR_PRI_FAIL bit. In the embodiment of FIG. 1, the selection logic 142 generates a binary one value on address bit XA23 to select the primary loader 118A or generates a binary zero value on address bit XA23 to select the secondary loader 118B, as described by Eq. (1) above. In the embodiment of FIG. 2, the selection logic 142 generates a true value on reset B 134B to select the primary loader 118A or generates a true value on reset A 134A to select the secondary loader 118B, as described by Eqs. (2) and (3) above. Flow proceeds to block 414.

At block 414, the loader 118 selected at block 412 copies itself from FLASH memory 102 (in the embodiment of FIG. 1, from FLASH memory 102; in the embodiment of FIG. 2, from FLASH memory A 102A or FLASH memory B 102B) to RAM 104. The selected loader 118 then sets the DRAM_WDT bit to indicate that the microprocessor 108 starts executing the loader 118 from RAM 104 and will henceforth be accessing an application program 116 in FLASH memory 102 (in the embodiment of FIG. 1, in FLASH memory 102; in the embodiment of FIG. 2, in FLASH memory C 102C) to perform the application program 116 copy to RAM 104 at block 418 below. The selected loader 118 then executes a program control transfer instruction (such as a jump, branch, or call instruction) to cause the processor 108 to begin executing the loader 118 out of the RAM 104. Flow proceeds to block 416.

At block 416, the loader 118 (executing out of the RAM 104) writes to the PRI_ACCESS bit to cause the selection logic 142 to select the appropriate one of the primary application 116A and secondary application 116B based on the application program 116 boot history. In the normal case, the loader 118 clears the PRI_ACCESS bit to select the secondary application 116B if the primary application 116A has failed to boot on the most recent attempt to boot an application program 116 (as indicated by the APP_PRI_FAIL bit being set), and otherwise the loader 118 sets the PRI_ACCESS bit to select the primary application 116A. Flow proceeds to block 418.

At block 418, the loader 118 executes instructions to read the application program 116 from FLASH memory 102 and to write the application program 116 to the RAM 104. As the processor 108 executes the instructions to read the application program 116 from FLASH memory 102, the selection logic 142 selects the appropriate application program 116 copy based on the value written to the PRI_ACCESS bit at block 416. In one embodiment, copying the application program 116 comprises decompressing a compressed form of the application program 116 stored in the FLASH memory 102 and writing the decompressed form of the application program 116 to the RAM 104. Flow proceeds to block 422.

At block 422, the loader 118 disables the watch dog timer 106 from monitoring the loader 118 boot and re-enables the watch dog timer 106 to begin monitoring the application program 116 boot. In one embodiment, the loader 118 accomplishes step 422 as an atomic operation by writing the binary value 8'b100xx011 to the WDT_CONTROL_REG 154, which simultaneously disables the watch dog timer 106 from expiring for the loader 118 (by setting the CLEAR_CNT bit), informs the CPLD 122 that the application program 116 is now running (or about to be running) rather than the loader 118 out of RAM 104 (via the LDR_WDT and DRAM_WDT bits), and enables the watch dog timer 106 (by setting the ENABLE bit) to monitor the now running (or about to be running) application program 116. The loader 118 also writes a binary one to the PRI_ACCESS bit if attempting to boot the primary application 116A (because the APP_PRI_FAIL bit is clear and the USE_SEC bit is clear), and writes a binary zero to the PRI_ACCESS bit if attempting to boot the secondary application 116B (because the APP_PRI_FAIL bit is set or the USE_SEC bit is set). Prior to writing the WDT_CONTROL_REG 154, the loader 118 may write a value in the WDT_COUNT_REG 152 different from the reset value in order to set up a timeout period for the application program 116 different from the loader 118 timeout period. Flow proceeds to block 424.

At block 424, the loader 118 executes a program control transfer instruction (such as a jump, branch, or call instruction) to cause the processor 108 to begin executing the application program 116 out of the RAM 104 that was copied there at block 418. In one embodiment, the instruction that writes to the WDT_CONTROL_REG 154 at block 422 and the instruction that jumps to the application program 116 at block 424 comprise the last two instructions of the loader 118. In another embodiment, the instruction that writes to the WDT_CONTROL_REG 154 at block 422 is the first instruction of the application program 116. Flow proceeds to block 426.

At block 426, the application program 116 executes all of its initialization code and determines that it has successfully booted. For example, the application program 116 may determine it has successfully booted when it is ready to accept I/O requests from the host computers and/or when it is ready to transfer user data with the disk drives. Flow proceeds to block 428.

At block 428, the application program 116 disables the watch dog timer 106 (by clearing the ENABLE bit) since it has successfully booted. Flow ends at block 428.

Advantageously, beginning at block 406 and up to block 422, the watch dog timer 106 runs, or ticks, while the loader 118 executes (or fails to execute if the current loader 118 copy is bad) completely independently of the execution of the loader 118 by the microprocessor 108. Consequently, the watch dog timer 106 may expire asynchronously with respect to execution of the loader 118 by the microprocessor 108. As shown in FIG. 4, if the watch dog timer 106 expires during any of blocks 408 through 418, flow proceeds to block 432.

At block 432, the CPLD 122 updates the watch dog timer 106 loader boot history state based on which copy of the loader 118 failed to boot. If the primary loader 118A failed, the CPLD 122 sets the LDR_PRI_FAIL bit; additionally, if the LDR_SEC_FAIL bit is set, the CPLD 122 sets the LDR_SEC_PRE_FAIL bit and clears the LDR_SEC_FAIL bit. Conversely, if the secondary loader 118B failed, the CPLD 122 sets the LDR_SEC_FAIL bit; additionally, if the LDR_PRI_FAIL bit is set, the CPLD 122 sets the LDR_PRI_PRE_FAIL bit and clears the LDR_PRI_FAIL bit. The CPLD 122 determines that the primary loader 118A failed if the LDR_WDT bit is set and the LDR_PRI_FAIL bit is clear; the CPLD 122 determines that the secondary loader 118B failed if the LDR_WDT bit is set, the LDR_PRI_FAIL bit is set, and the LDR_SEC_FAIL bit is clear, as described in FIG. 3. Flow proceeds to block 434.

At block 434, the CPLD 122 generates a controller reset 132. This causes the WDT_COUNT_REG 152 and WDT_CONTROL_REG 154 to obtain their reset values, and in particular to re-enable the watch dog timer 106 to monitor the immediately ensuing next attempt to boot the other copy of the loader 118, i.e., the copy that did not just fail to boot. The controller reset 132 also resets the microprocessor 108. Flow returns to block 408 to attempt to boot the other copy of the loader 118.

Advantageously, beginning at block 422 and up to block 428, the watch dog timer 106 runs, or ticks, while the application program 116 executes (or fails to execute if the current application program 116 copy is bad) completely independently of the execution of the application program 116 by the microprocessor 108. Consequently, the watch dog timer 106 may expire asynchronously with respect to execution of the application program 116 by the microprocessor 108. As shown in FIG. 4, if the watch dog timer 106 expires during any of blocks 424 through 426, flow proceeds to block 436.

At block 436, the CPLD 122 updates the watch dog timer 106 application boot history state based on which copy of the application program 116 failed to boot. If the primary application 116A failed, the CPLD 122 sets the APP_PRI_FAIL bit; additionally, if the APP_SEC_FAIL bit is set when the primary application 116A failed, the CPLD 122 sets the APP_SEC_PRE_FAIL bit and clears the APP_SEC_FAIL bit. Conversely, if the secondary application 116B failed, the CPLD 122 sets the APP_SEC_FAIL bit; additionally, if the APP_PRI_FAIL bit is set when the secondary application 116B failed, the CPLD 122 sets the APP_PRI_PRE_FAIL bit and clears the APP_PRI_FAIL bit. The CPLD 122 determines that the primary application 116A failed if the LDR_WDT bit is clear and the APP_PRI_FAIL bit is clear; the CPLD 122 determines that the secondary application 116B failed if the LDR_WDT bit is clear, the APP_PRI_FAIL bit is set, and the APP_SEC_FAIL bit is clear, as described in FIG. 3. Flow proceeds to block 434.

In one embodiment, the maximum timeout period of the watch dog timer 106 (which is 4 seconds in the embodiment of FIG. 3) may be less than the maximum time required for normal successful boot of the loader 118 or application program 116. In such an embodiment, the loader 118 or application program 116 may disable/re-enable the watch dog timer 106 at appropriate intervals during the boot process in a manner similar to the step performed at block 422; however, unlike the step performed at block 422, the loader 118 or application program 116 retains the value of the LDR_WDT bit.

Referring now to FIG. 5, a state transition diagram illustrating operation of the controller 100 of FIGS. 1 and 2 according to the present invention is shown. FIG. 5 illustrates seven states: power off 502, reset 504, loader A 506, loader B 508, application A 512, application B 514, and controller booted 516.

The power off 502 state is characterized by the controller 100 being powered off. The reset 504 state is characterized by the CPLD 122 asserting the controller reset signal 132. The loader A 506 state is characterized by the LDR_WDT bit being set and the LDR_PRI_FAIL bit being clear and the microprocessor 108 attempting to boot the primary loader 118A. The loader B 508 state is characterized by the LDR_WDT bit being set, the LDR_PRI_FAIL bit being set, the LDR_SEC_FAIL bit being clear, and the microprocessor 108 attempting to boot the secondary loader 118B. The application A 512 state is characterized by the LDR_WDT bit being clear, the APP_PRI_FAIL bit being clear, and the microprocessor 108 attempting to boot the primary application 116A. The application B 514 state is characterized by the LDR_WDT bit being clear, the APP_PRI_FAIL bit being set, the APP_SEC_FAIL bit being clear, and the microprocessor 108 attempting to boot the secondary application 116B. The controller booted 516 state is characterized by the ENABLE bit being clear and the microprocessor 108 executing an application program 116.

From the power off 502 state, when power is applied to the controller 100, a transition to the loader A 506 state occurs.

From the reset 504 state: if the LDR_PRI_FAIL bit is clear, a transition to the loader A 506 occurs; if the LDR_PRI_FAIL bit is set, a transition to the loader B 508 occurs.

From the loader A 506 state: if the watch dog timer 106 expires, a transition to the reset 504 state occurs; if the primary loader 118A successfully boots and the APP_PRI_FAIL bit is clear, a transition to the application A 512 state occurs; if the primary loader 118A successfully boots and the APP_PRI_FAIL bit is set, a transition to the application B 514 state occurs.

From the loader B 508 state: if the watch dog timer 106 expires, a transition to the reset 504 state occurs; if the secondary loader 118B successfully boots and the APP_PRI_FAIL bit is clear, a transition to the application A 512 state occurs; if the secondary loader 118B successfully boots and the APP_PRI_FAIL bit is set, a transition to the application B 514 state occurs.

From the application A 512 state: if the watch dog timer 106 expires, a transition to the reset 504 state occurs; if the primary application 116A successfully boots, a transition to the controller booted 516 state occurs.

From the application B 514 state: if the watch dog timer 106 expires, a transition to the reset 504 state occurs; if the secondary application 116B successfully boots, a transition to the controller booted 516 state occurs.

As may be observed from FIG. 5, the controller 100 is capable of various boot sequences, depending upon which of the stored program copies 116A/116B/118A/118B are good and which are bad. For example, if the primary loader 118A is bad, the secondary loader 118B is good, the primary application 116A is bad, and the secondary application 116B is good, then the following state transitions will occur: power off 502 to loader A 506 to reset 504 to loader B 508 to application A 512 to reset 504 to loader B 508 to application B 514 to controller booted 516. For another example, if the primary loader 118A is good, the primary application 116A is bad, and the secondary application 116B is good, then the following state transitions will occur: power off 502 to loader A 506 to application A 512 to reset 504 to loader A 506 to application B 514 to controller booted 516.

Referring now to FIG. 7, a block diagram illustrating failure counts and event logs 702 through 742 maintained by the RAID system of FIG. 8 according to the present invention is shown. The functions of the failure counts and event logs are described below with respect to the remaining Figures. As shown in FIG. 7, a portion of the failure counts and event logs are stored in the FLASH memory 102 of the RAID controller 100 of FIG. 1, a portion of the failure counts and event logs are stored in the FLASH memory 902 of the management controller 900 of FIG. 9, and a portion of the failure counts and event logs are stored in the FLASH memory 1002 of the enclosure controller 1000 of FIG. 10. In one embodiment, the failure counts and event logs of FIG. 7 are stored in the FLASH memories 102/902/1002 so that they may be maintained through resets or power cycles of the system 800 of FIG. 8. When the system 800 is manufactured, the failure counts are initially programmed to zero. In one embodiment, the failure counts may be reset to zero in response to user input, such as in response to replacement of a FLASH memory device.

Referring now to FIG. 6, a flowchart illustrating operation of the controller 100 of FIGS. 1 and 2 to detect, notify, and repair a failed copy of code according to the present invention is shown. Flow begins at block 602.

At block 602, the controller 100 successfully boots to one of the copies of the application program 116, such as according to block 426 of FIG. 4 and state 516 of FIG. 5. Flow proceeds to block 604.

At block 604, the code repair daemon 151 begins executing. In one embodiment, the code repair daemon 151 comprises a background process that executes at a low priority relative to other processes of the application program 116 executed by the processor 108. Flow proceeds to block 606.

At block 606, the code repair daemon 151 examines the WDT_STATUS_REG 156. Flow proceeds to decision block 609.

At decision block 609, the code repair daemon 151 determines whether the LDR_PRI_FAIL bit is set. If so, flow proceeds to block 612; otherwise, flow proceeds to decision block 619.

At block 612, the code repair daemon 151 logs an informational event to the event logs 742 of FIG. 7 and updates the loader primary failure count 702 of FIG. 7 to indicate that a failure of the primary loader program 118A has been detected. That is, the code repair daemon 151 increments the loader primary failure count 702. In one embodiment, the event logs 742 include multiple severity levels of events, and the user may specify which events to receive notification of according to severity level. Additionally, if the loader primary failure count 702 has reached a user-programmable threshold, the code repair daemon 151 displays a warning message to the user via a user interface. Flow proceeds to block 614.

At block 614, the code repair daemon 151 repairs the primary loader 118A using the secondary loader 118B. The code repair daemon 151 repairs the primary loader 118A using the secondary loader 118B by copying the secondary loader 118B to the primary loader 118A. That is, the code repair daemon 151 reads the bytes of program instructions from the location in the FLASH memory 102 at which the secondary loader 118B is stored, and programs the location in the FLASH memory 102 at which the primary loader 118A is stored with the bytes read from the secondary loader 118B. In one embodiment, the code repair daemon 151 first copies the secondary loader 118B from the FLASH memory 102 to a temporary location in the RAM 104, then programs the FLASH memory 102 at the location of the primary loader 118A with the copy of the secondary loader 118B stored in the RAM 104. In one embodiment, in order to reduce the impact of the repair on the performance of normal operations of the controller 100, such as providing data from disk arrays to host computers, the code repair daemon 151 performs the copy of the secondary loader 118B from the FLASH memory 102 to the RAM 104 and the programming from the RAM 104 to the primary loader 118A in the FLASH memory 102 in an incremental manner in relatively small chunks, for example in 512 byte increments. That is, the code repair daemon 151 copies one chunk to the RAM 104 and programs the chunk from the RAM 104 to the FLASH memory 102. The code repair daemon 151 repeats this process until the primary loader 118A has been repaired. In one embodiment, the code repair daemon 151 may insert a user-programmable amount of time in between each chunk. In one embodiment, the code repair daemon 151 performs a cyclic redundancy code (CRC) check of the secondary loader 118B to verify that the secondary loader 118B is good before using it to repair the primary loader 118A. Generally, the code repair daemon 151 performs a CRC check by generating a first CRC value of the bytes of the program copy to be checked, and determining whether the first CRC value matches a second CRC value of the program copy that was generated and stored in the FLASH memory 102 when the program copy was previously programmed into the FLASH memory 102. If the two CRC values match, the CRC check passes; if the two CRC values mismatch, the CRC check fails, which indicates a failure, or corruption, or defect of the secondary loader 118B. In one embodiment, although the failure of a program copy, such as the primary loader 118A, is detected during the boot process, the repair of the failed program copy, such as the primary loader 118A, is advantageously delayed until after the controller 100 has successfully booted a copy of the application program 116 in order to boot as quickly as possible, thereby enabling the controller 100 to perform normal operations as soon as possible. Flow proceeds to decision block 616.

At decision block 616, the code repair daemon 151 determines whether the LDR_SEC_PRE_FAIL bit is set. If so, flow proceeds to block 618; otherwise, flow proceeds to block 629.

At block 618, the code repair daemon 151 logs a warning event to the event logs 742 and updates the loader secondary previous failure count 708 of FIG. 7 to indicate that a previous failure of the secondary loader program 118B has been detected. Additionally, if the loader secondary previous failure count 708 has reached a user-programmable threshold, the code repair daemon 151 displays a warning message to the user via a user interface. Flow proceeds to block 629.

At decision block 619, the code repair daemon 151 determines whether the LDR_SEC_FAIL bit is set. If so, flow proceeds to block 622; otherwise, flow proceeds to decision block 629.

At block 622, the code repair daemon 151 logs an informational event to the event logs 742 and updates the loader secondary failure count 706 of FIG. 7 to indicate that a failure of the secondary loader program 118A has been detected. Additionally, if the loader secondary failure count 706 has reached a user-programmable threshold, the code repair daemon 151 displays a warning message to the user via a user interface. Flow proceeds to block 624.

At block 624, the code repair daemon 151 repairs the secondary loader 118B using the primary loader 118A. Flow proceeds to decision block 626.

At decision block 626, the code repair daemon 151 determines whether the LDR_PRI_PRE_FAIL bit is set. If so, flow proceeds to block 628; otherwise, flow proceeds to decision block 629.

At block 628, the code repair daemon 151 logs a warning event to the event logs 742 and updates the loader primary previous failure count 704 of FIG. 7 to indicate that a previous failure of the primary loader program 118B has been detected. Additionally, if the loader primary previous failure count 704 has reached a user-programmable threshold, the code repair daemon 151 displays a warning message to the user via a user interface. Flow proceeds to decision block 629.

At decision block 629, the code repair daemon 151 determines whether the APP_PRI_FAIL bit is set. If so, flow proceeds to block 632; otherwise, flow proceeds to decision block 639.

At block 632, the code repair daemon 151 logs an informational event to the event logs 742 and updates the application primary failure count 712 of FIG. 7 to indicate that a failure of the primary application program 116A has been detected. Additionally, if the application primary failure count 712 has reached a user-programmable threshold, the code repair daemon 151 displays a warning message to the user via a user interface. Flow proceeds to block 634.

At block 634, the code repair daemon 151 repairs the primary application 116A using the secondary application 116B. Flow proceeds to decision block 636.

At decision block 636, the code repair daemon 151 determines whether the APP_SEC_PRE_FAIL bit is set. If so, flow proceeds to block 638; otherwise, flow proceeds to block 649.

At block 638, the code repair daemon 151 logs a warning event to the event logs 742 and updates the application secondary previous failure count 718 of FIG. 7 to indicate that a previous failure of the secondary application program 116B has been detected. Additionally, if the application secondary previous failure count 718 has reached a user-programmable threshold, the code repair daemon 151 displays a warning message to the user via a user interface. Flow proceeds to block 649.

At decision block 639, the code repair daemon 151 determines whether the APP_SEC_FAIL bit is set. If so, flow proceeds to block 642; otherwise, flow proceeds to block 652.

At block 642, the code repair daemon 151 logs an informational event to the event logs 742 and updates the application secondary failure count 716 of FIG. 7 to indicate that a failure of the secondary application program 116A has been detected. Additionally, if the application secondary failure count 716 has reached a user-programmable threshold, the code repair daemon 151 displays a warning message to the user via a user interface. Flow proceeds to block 644.

At block 644, the code repair daemon 151 repairs the secondary application 116B using the primary application 116A. Flow proceeds to decision block 646.

At decision block 646, the code repair daemon 151 determines whether the APP_PRI_PRE_FAIL bit is set. If so, flow proceeds to block 648; otherwise, flow proceeds to block 652.

At block 648, the code repair daemon 151 logs a warning event to the event logs 742 and updates the application primary previous failure count 714 of FIG. 7 to indicate that a previous failure of the primary application program 116B has been detected. Additionally, if the application primary previous failure count 714 has reached a user-programmable threshold, the code repair daemon 151 displays a warning message to the user via a user interface. Flow proceeds to block 652.

At block 652, the code repair daemon 151 performs a CRC check of the primary loader 118A. Flow proceeds to decision block 653.

At decision block 653, the code repair daemon 151 determines whether the CRC check performed at block 652 failed. If so, flow proceeds to block 654; otherwise, flow proceeds to block 656.

At block 654, the code repair daemon 151 logs an informational event to the event logs 742 and updates the loader primary failure count 702 to indicate that a failure of the primary loader program 118A has been detected. Additionally, if the loader primary failure count 702 has reached a user-programmable threshold, the code repair daemon 151 displays a warning message to the user via a user interface. Flow proceeds to block 655.

At block 655, the code repair daemon 151 repairs the primary loader 118A using the secondary loader 118B. Flow proceeds to block 656.

At block 656, the code repair daemon 151 performs a CRC check of the secondary loader 118B. Flow proceeds to decision block 657.

At decision block 657, the code repair daemon 151 determines whether the CRC check performed at block 656 failed. If so, flow proceeds to block 658; otherwise, flow proceeds to block 662.

At block 658, the code repair daemon 151 logs an informational event to the event logs 742 and updates the loader secondary failure count 706 to indicate that a failure of the secondary loader program 118B has been detected. Additionally, if the loader secondary failure count 706 has reached a user-programmable threshold, the code repair daemon 151 displays a warning message to the user via a user interface. Flow proceeds to block 659.

At block 659, the code repair daemon 151 repairs the secondary loader 118B using the primary loader 118A. Flow proceeds to block 662.

At block 662, the code repair daemon 151 performs a CRC check of the primary application 116A. Flow proceeds to decision block 663.

At decision block 663, the code repair daemon 151 determines whether the CRC check performed at block 662 failed. If so, flow proceeds to block 664; otherwise, flow proceeds to block 666.

At block 664, the code repair daemon 151 logs an informational event to the event logs 742 and updates the application primary failure count 712 to indicate that a failure of the primary application program 116A has been detected. Additionally, if the application primary failure count 712 has reached a user-programmable threshold, the code repair daemon 151 displays a warning message to the user via a user interface. Flow proceeds to block 665.

At block 665, the code repair daemon 151 repairs the primary application 116A using the secondary application 116B. Flow proceeds to block 666.

At block 666, the code repair daemon 151 performs a CRC check of the secondary application 116B. Flow proceeds to decision block 667.

At decision block 667, the code repair daemon 151 determines whether the CRC check performed at block 666 failed. If so, flow proceeds to block 668; otherwise, flow proceeds to block 672.

At block 668, the code repair daemon 151 logs an informational event to the event logs 742 and updates the application secondary failure count 716 to indicate that a failure of the secondary application program 116B has been detected. Additionally, if the application secondary failure count 716 has reached a user-programmable threshold, the code repair daemon 151 displays a warning message to the user via a user interface. Flow proceeds to block 669.

At block 669, the code repair daemon 151 repairs the secondary application 116B using the primary application 116A. Flow proceeds to block 672.

At block 672, the code repair daemon 151 performs a CRC check of the primary FPGA code 117A. Flow proceeds to decision block 673.

At decision block 673, the code repair daemon 151 determines whether the CRC check performed at block 672 failed. If so, flow proceeds to block 674; otherwise, flow proceeds to block 676.

At block 674, the code repair daemon 151 logs an informational event to the event logs 742 and updates the FPGA primary failure count 722 to indicate that a failure of the primary FPGA code 117A has been detected. Additionally, if the FPGA primary failure count 722 has reached a user-programmable threshold, the code repair daemon 151 displays a warning message to the user via a user interface. Flow proceeds to block 675.

At block 675, the code repair daemon 151 repairs the primary FPGA code 117A using the secondary FPGA code 117B. Flow proceeds to block 676.

At block 676, the code repair daemon 151 performs a CRC check of the secondary FPGA code 117B. Flow proceeds to decision block 677.

At decision block 677, the code repair daemon 151 determines whether the CRC check performed at block 676 failed. If so, flow proceeds to block 678; otherwise, flow proceeds to block 682.

At block 678, the code repair daemon 151 logs an informational event to the event logs 742 and updates the FPGA secondary failure count 724 to indicate that a failure of the secondary FPGA code 117B has been detected. Additionally, if the FPGA secondary failure count 724 has reached a user-programmable threshold, the code repair daemon 151 displays a warning message to the user via a user interface. Flow proceeds to block 679.

At block 679, the code repair daemon 151 repairs the secondary FPGA code 117B using the primary FPGA code 117A. Flow proceeds to block 682.

At block 682, the code repair daemon 151 performs a CRC check of the application code 116 that is executing out of the RAM 104. In one embodiment, the loader program 118 generates a CRC value for the application code 116 running out of the RAM 104 after loading the application code 116 from the FLASH memory 102 to the RAM 104 at block 418 of FIG. 4 and writes the CRC value to the RAM 104. The code repair daemon 151 performs the CRC check at block 682 by comparing the just-generated CRC with the CRC value previously written to the RAM 104 at block 418. If the two CRC values match, the CRC check passes; if the two CRC values mismatch, the CRC check fails. Flow proceeds to decision block 683.

At decision block 683, the code repair daemon 151 determines whether the CRC check performed at block 682 failed. If so, flow proceeds to block 684; otherwise, flow proceeds to block 652.

At block 684, the code repair daemon 151 logs an informational event to the event logs 742 and updates the application RAM failure count 736 to indicate that a failure of the application code 116 running out of RAM 104 has been detected. Additionally, if the application RAM failure count 736 has reached a user-programmable threshold, the code repair daemon 151 displays a warning message to the user via a user interface. Flow proceeds to block 685.

At block 685, the code repair daemon 151 causes the controller 100 to fail over to the partner redundant controller and reboots the controller 100 in which the failure was detected in the application code 116 running out of the RAM 104. In one embodiment, a communication link enables the redundant controllers 100 to communicate with one another, and in particular, enables a controller 100 that has detected a failure to instruct the other controller 100 to resume control of the disk arrays for the failed controller 100. In one embodiment, the communications link comprises a PCI-Express high-speed serial interface. Flow proceeds to block 686.

At block 686, the previously failed controller 100 boots up successfully, such as at block 426 of FIG. 4, and a fail back to the previously failed controller 100 is performed to resume redundant operation of the redundant controller 100 system. It is noted that the steps at block 685 and 686 cannot be performed in a system that does not include redundant controllers 100. Flow returns to block 652 to continuously check for failed copies of code. In one embodiment, the code repair daemon 151 may insert a user-programmable amount of time between each iteration of the steps at blocks 652 through 686 in order to allow the user to affect the amount of resources consumed by the code repair daemon 151.

Figure 9:
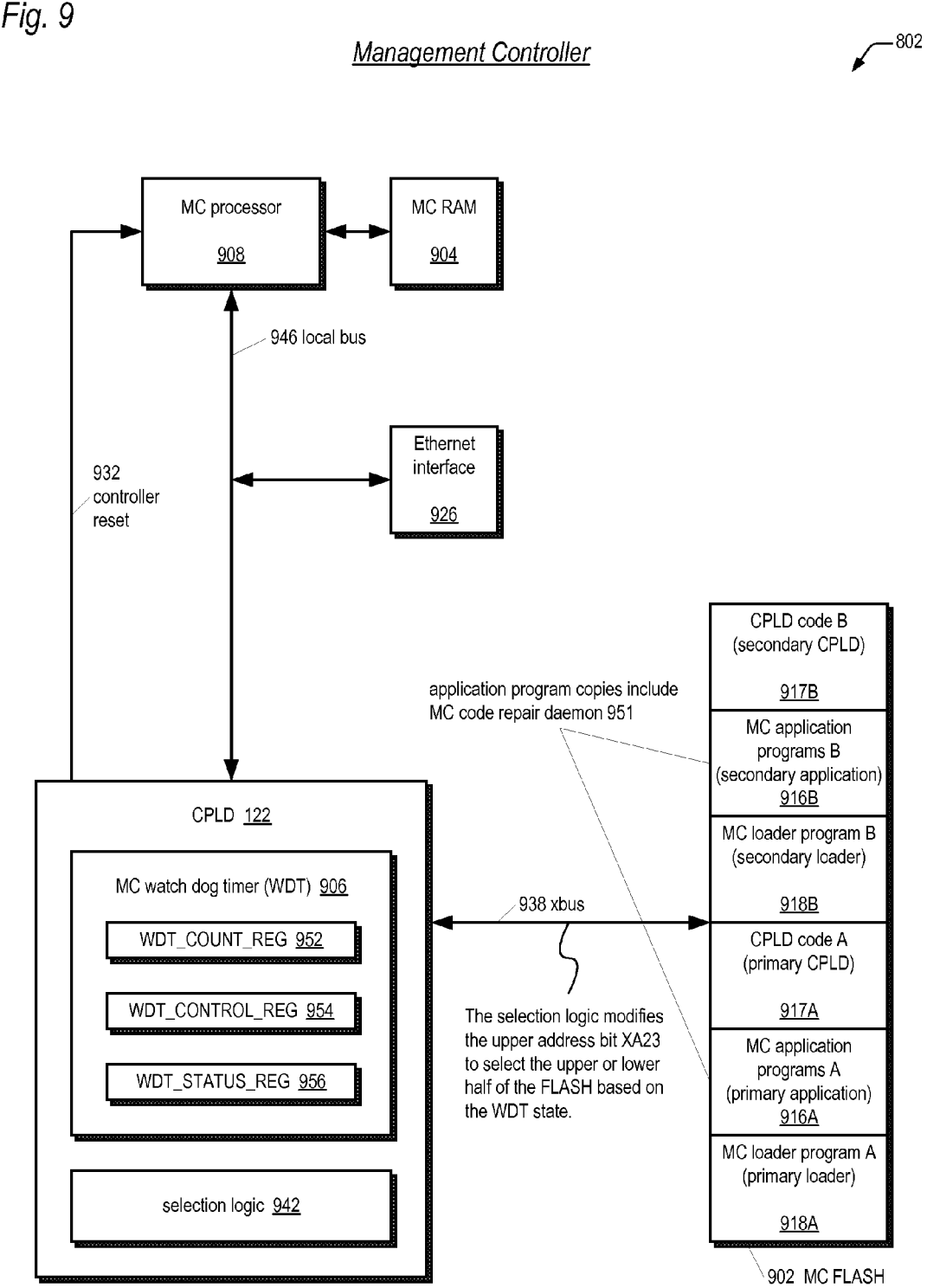
FIG. 9 is a block diagram illustrating in more detail the management controller of FIG. 8 according to the present invention.

Referring now to FIG. 8, a block diagram illustrating a RAID system 800 including the RAID controller 100 of FIG. 1 according to the present invention is shown. The RAID system 800 includes the RAID controller 100 of FIG. 1, a management controller 802, an enclosure controller 804, and a power supply subsystem 806. The RAID controller 100 includes the CPLD 122 of FIG. 1, which includes the watch dog timer 106 of FIG. 1. Additionally, the CPLD 122 includes a watch dog timer 906 for the management controller 802 and a watch dog timer 1006 for the enclosure controller 804 that are distinct from the RAID controller 100 watch dog timer 106. The management controller 802 and enclosure controller 804 are each coupled to the CPLD 122 and configured to access their respective watch dog timers 906 and 1006. The management controller 802, described in more detail with respect to FIG. 9, provides a management interface to a user, such as a system administrator, to enable the user to manage the RAID system 800, such as to configure disk arrays and various configuration parameters of the RAID controller 100. The enclosure controller 804, described in more detail with respect to FIG. 10, controls various aspects of an enclosure that encloses the RAID system 800, such as monitoring the temperatures of components of the RAID system 800, such as disk drives and integrated circuits, and such as monitoring cooling devices, such as fans. The management controller 802 and enclosure controller 804 offload functionality from the RAID controller 100 which enables the RAID controller 100 to perform its primary function of transferring data between the host computers and storage devices more efficiently.

The power supply subsystem 806 supplies power to the other system 800 components, in particular, to the RAID controller 100, management controller 802 and enclosure controller 804. In one embodiment, the power supply subsystem 806 comprises redundant hot-pluggable power supplies. The power supply subsystem 806 includes a microcontroller with a CPU 862 and memory 864. In one embodiment, the memory 864 comprises a ROM-able FLASH memory. The CPU 862 executes program code 1017 (shown in FIG. 10) to control the supplying of power to the RAID system 800, such as to increase the efficiency and longevity of the energy sources, including batteries and super-capacitors. The power supply subsystem 806 program code 1017 is initially stored in a FLASH memory 1002 (shown in FIG. 10) of the enclosure controller 804. The enclosure controller 804 stores the power supply subsystem 806 program code 1017 to the memory 864 at initialization of the power supply subsystem 806 for execution by the CPU 862.

Referring now to FIG. 9, a block diagram illustrating in more detail the management controller 802 of FIG. 8 according to the present invention is shown. The management controller 802 includes many components similar to the RAID controller 100 of FIG. 1 that function similarly. In FIG. 9, the similar components are numbered in the 900-999 range rather than in the 100-199 range of FIG. 1. In particular, the management controller 802 includes a processor 908, RAM 904, and FLASH memory 902. In one embodiment, the processor 908 comprises an AMD Elan SC-520 microcontroller. The processor 908 is coupled to the CPLD 122 of FIG. 8 via a local bus 946, and the FLASH memory 902 is coupled to the CPLD 122 via an xbus 938. In one embodiment, the processor 908 includes an xbus 938 interface, and the CPLD 122 and FLASH memory 902 are each directly coupled to the processor 908 via the xbus 938. In this embodiment, the XA23 upper address bit still goes through the CPLD 122 to the FLASH 902 in order to enable the CPLD 122 to control the XA23 bit for selecting the appropriate portion of the FLASH 902 accessed by the processor 908. The management controller 802 watch dog timer 906 includes a WDT_COUNT register 952, a WDT_CONTROL register 954, and a WDT_STATUS register 956 that function for the management controller 802 similarly to the corresponding registers of the RAID controller 100 watch dog timer 106. The CPLD 122 provides a controller reset signal 932 to reset the processor 908 if the management controller 802 watch dog timer 906 times out similar to the functionality described above with respect to FIGS. 4 and 5 of the RAID controller 100. The CPLD 122 selection logic 942 provides functionality for the management controller 802 to access the code copies of the FLASH 902 similar to the functionality provided by the RAID controller 100 selection logic 142. The management controller 802 also includes an Ethernet interface 926, coupled to the local bus 946, for providing the management interface to the user, such as via a TCP/IP connection. In one embodiment, the Ethernet interface comprises an AMD AM79C975. In one embodiment, the management controller 802 includes other management interfaces, such as a UART.

Similar to the FLASH memory 102 of the RAID controller 100, the management controller 802 FLASH memory 902 stores a primary loader 918A and secondary loader 918B, and a primary application 916A and secondary application 916B for execution by the processor 908 to perform the management functions of the management controller 802. The management controller 802 performs a boot operation similar to the boot operation described with respect to the RAID controller 100 in FIGS. 3 through 5, resulting in one copy of the application program 916 executing from the RAM 904 and the values of the watch dog timer 906 populated to reflect the events that occurred during the boot process.

The FLASH memory 902 also stores primary CPLD code 917A and secondary CPLD code 917B. The CPLD code 917 includes code for configuring the logic within the CPLD 122 to cause the CPLD 122 to perform its desired function. In one embodiment, the CPLD 122 includes non-volatile memory that is programmed when the RAID controller 100 is manufactured. The non-volatile memory retains the CPLD code 917 through a reset or power cycle of the CPLD 122. However, the processor 908 may also program the non-volatile memory with the CPLD code 917 stored in the FLASH memory 902 if the CPLD 122 fails or if an update of the CPLD code 917 is required. The management controller 802 application code 916 includes a code repair daemon 951 that performs operations for detecting and repairing failures of the program copies 916/917/918 stored in the FLASH memory 902 of the management controller 802 similar to the operations performed by the RAID controller 100 code repair daemon 151. However, one difference is that the management controller 802 code repair daemon 951, detects, notifies, and repairs failures in the management controller 802 loader program copies 918 and application program copies 916, rather than in the RAID controller 100 loader program copies 118 and application program copies 116. Another difference is that the management controller 802 code repair daemon 951, detects, notifies, and repairs failures in the CPLD code 917, rather than in the FPGA code 117 of the RAID controller 100.

Figure 10:
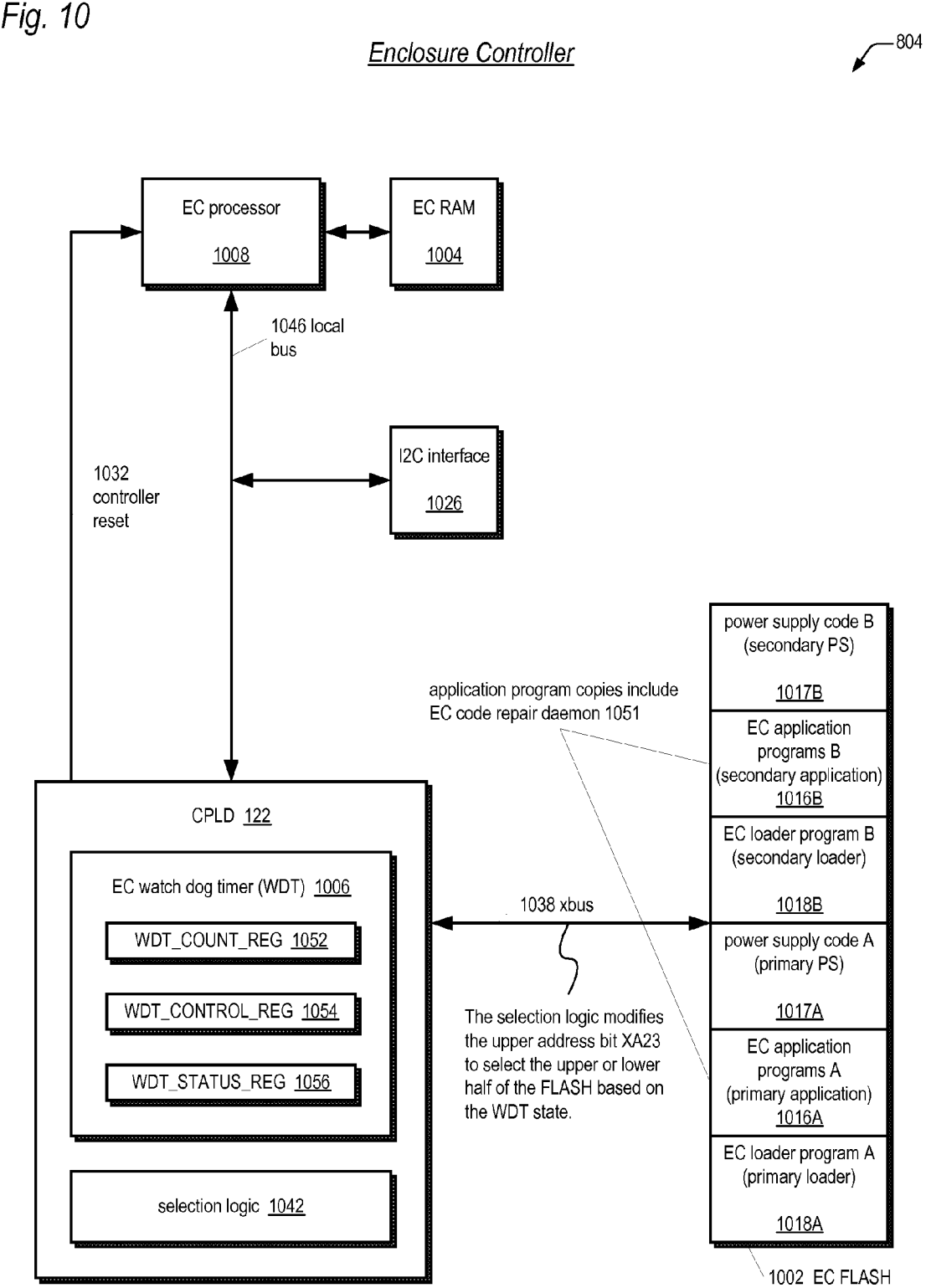
FIG. 10 is a block diagram illustrating in more detail the enclosure controller of FIG. 8 according to the present invention.

Referring now to FIG. 10, a block diagram illustrating in more detail the enclosure controller 804 of FIG. 8 according to the present invention is shown. Like the management controller 802, the enclosure controller 804 includes many components similar to the RAID controller 100 of FIG. 1 that function similarly. In FIG. 10, the similar components are numbered in the 1000-1099 range rather than in the 100-199 range of FIG. 1. In particular, the enclosure controller 804 includes a processor 1008, RAM 1004, and FLASH memory 1002. The processor 1008 is coupled to the CPLD 122 of FIG. 8 via a local bus 1046, and the FLASH memory 1002 is coupled to the CPLD 122 via an xbus 1038. The enclosure controller 804 watch dog timer 1006 includes a WDT_COUNT register 1052, a WDT_CONTROL register 1054, and a WDT_STATUS register 1056 that function for the enclosure controller 804 similarly to the corresponding registers of the RAID controller 100 watch dog timer 106. The CPLD 122 provides a controller reset signal 1032 to reset the processor 1008 if the enclosure controller 804 watch dog timer 1006 times out similar to the functionality described above with respect to FIGS. 4 and 5 of the RAID controller 100. The CPLD 122 selection logic 1042 provides functionality for the enclosure controller 804 to access the code copies of the FLASH 1002 similar to the functionality provided by the RAID controller 100 selection logic 142. The enclosure controller 804 also includes an I²C interface 1026, coupled to the local bus 1046, for enabling the processor 1008 to monitor and control the components within the RAID system 800 enclosure.

Similar to the FLASH memory 102 of the RAID controller 100, the enclosure controller 804 FLASH memory 1002 stores a primary loader 1018A and secondary loader 1018B, and a primary application 1016A and secondary application 1016B for execution by the processor 1008 to perform the enclosure monitoring and control functions of the enclosure controller 804. The enclosure controller 804 performs a boot operation similar to the boot operation described with respect to the RAID controller 100 in FIGS. 3 through 5, resulting in one copy of the application program 1016 executing from the RAM 1004 and the values of the watch dog timer 1006 populated to reflect the events that occurred during the boot process. The FLASH memory 1002 also stores the primary power supply code 1017A and secondary power supply code 1017B for provision to the power supply subsystem 806. The enclosure controller 804 application code 1016 includes a code repair daemon 1051 that performs operations for detecting and repairing failures of the program copies 1016/1017/1018 stored in the FLASH memory 1002 of the enclosure controller 804 similar to the operations performed by the RAID controller 100 code repair daemon 151. However, one difference is that the enclosure controller 804 code repair daemon 1051, detects, notifies, and repairs failures in the enclosure controller 804 loader program copies 1018 and application program copies 1016, rather than in the RAID controller 100 loader program copies 118 and application program copies 116. Another difference is that the enclosure controller 804 code repair daemon 1051, detects, notifies, and repairs failures in the power supply code 1017, rather than in the FPGA code 117 of the RAID controller 100.

In one embodiment, the enclosure controller 804 also performs additional functions and includes additional interfaces. For example, the enclosure controller 804 may comprise a SAS expander including a plurality of SAS interfaces and I²C interfaces. In one embodiment, the SAS expander comprises a PMC PM8388.

In one embodiment, the FLASH memory 1002 also stores two copies of an initializer string. The initializer string includes important configuration information for the RAID system 800. A CRC value of the initializer string is stored in the FLASH memory 1002 along with the initializer string to facilitate run-time detection, notification, and repair of a failure of the initializer string similar to the operations performed for the other duplicated code components.

In one embodiment, the RAID controller 100 views the enclosure controller 804 as a SCSI device and communicates with the enclosure controller 804 via SCSI commands such as READ BUFFER, WRITE BUFFER, SEND DIAGNOSTICS, etc.

Figure 11:
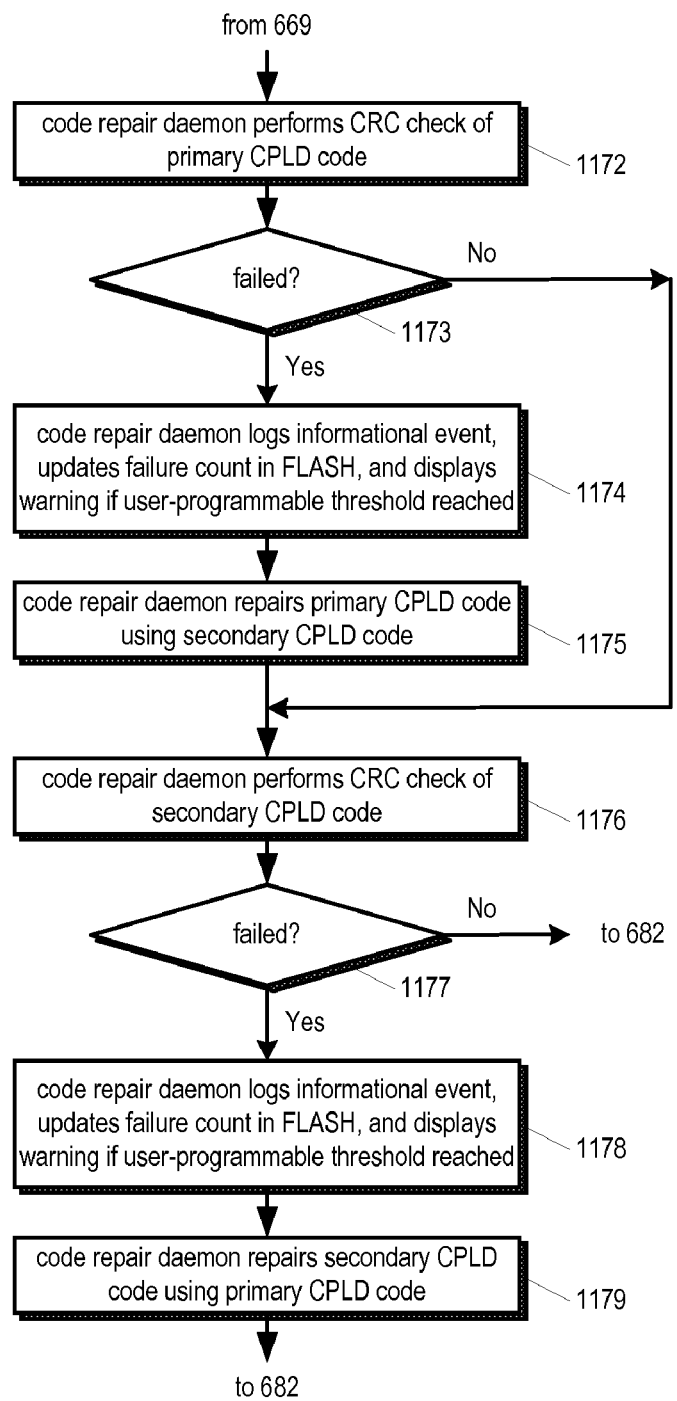
FIG. 11 is a flowchart illustrating operation of the management controller of FIG. 8 to detect, notify, and repair a failed copy of code stored in the management controller FLASH memory according to the present invention.

Referring now to FIG. 11, a flowchart illustrating operation of the management controller 802 of FIG. 8 to detect, notify, and repair a failed copy of code stored in the management controller 802 FLASH memory 902 according to the present invention is shown. The flowchart of FIG. 11 is similar to the flowchart of FIG. 6. However, blocks 672 through 679 of FIG. 6 are replaced by blocks 1172 through 1179 in FIG. 11. Furthermore, the management controller 802 code repair daemon 951 performs code failure detection, notification, and repair steps on the management controller 802 code copies in the FLASH memory 902 and RAM 904 similar to those performed by the RAID controller 100 processor 108 described above with respect to blocks 602 through 669 and 682 through 686; however, for the sake of brevity, these blocks are not repeated in FIG. 11.

As shown in FIG. 11, flow proceeds from block 669 to block 11172.

At block 1172, the code repair daemon 951 performs a CRC check of the primary CPLD code 917A. Flow proceeds to decision block 1173.

At decision block 1173, the code repair daemon 951 determines whether the CRC check performed at block 1172 failed. If so, flow proceeds to block 1174; otherwise, flow proceeds to block 11176.

At block 1174, the code repair daemon 951 logs an informational event to the event logs 742 and updates the CPLD primary failure count 726 to indicate that a failure of the primary CPLD code 917A has been detected. Additionally, if the CPLD primary failure count 726 has reached a user-programmable threshold, the code repair daemon 951 displays a warning message to the user via a user interface. Flow proceeds to block 1175.

At block 1175, the code repair daemon 951 repairs the primary CPLD code 917A using the secondary CPLD code 917B. Flow proceeds to block 1176.

At block 1176, the code repair daemon 951 performs a CRC check of the secondary CPLD code 917B. Flow proceeds to decision block 1177.

At decision block 1177, the code repair daemon 951 determines whether the CRC check performed at block 1176 failed. If so, flow proceeds to block 1178; otherwise, flow proceeds to block 682.

At block 1178, the code repair daemon 951 logs an informational event to the event logs 742 and updates the CPLD secondary failure count 728 to indicate that a failure of the secondary CPLD code 917B has been detected. Additionally, if the CPLD secondary failure count 728 has reached a user-programmable threshold, the code repair daemon 951 displays a warning message to the user via a user interface. Flow proceeds to block 1179.

At block 1179, the code repair daemon 951 repairs the secondary CPLD code 917B using the primary CPLD code 917A. Flow proceeds to block 682.

Figure 12:
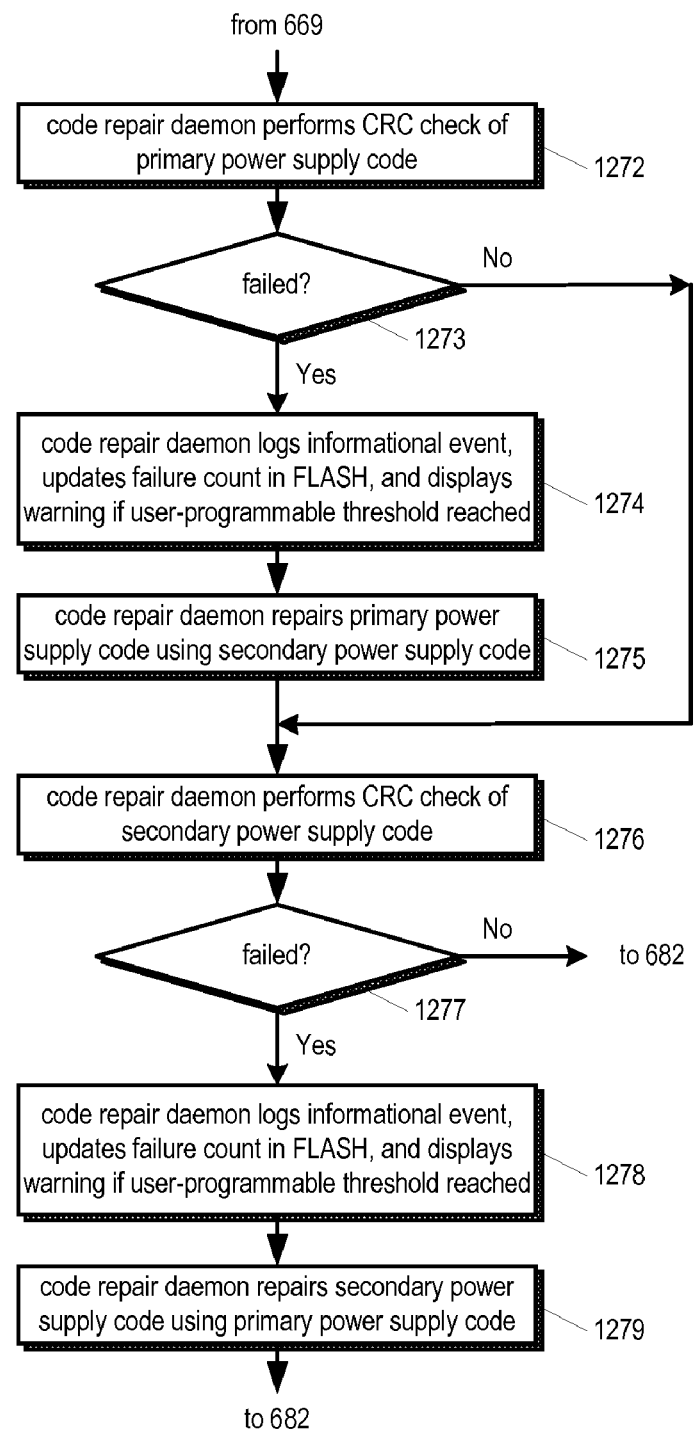
FIG. 12 is a flowchart illustrating operation of the enclosure controller of FIG. 8 to detect, notify, and repair a failed copy of code stored in the enclosure controller FLASH memory according to the present invention.

Referring now to FIG. 12, a flowchart illustrating operation of the enclosure controller 804 of FIG. 8 to detect, notify, and repair a failed copy of code stored in the enclosure controller 804 FLASH memory 1002 according to the present invention is shown. The flowchart of FIG. 12 is similar to the flowchart of FIG. 6. However, blocks 672 through 679 of FIG. 6 are replaced by blocks 1272 through 1279 in FIG. 12. Furthermore, the enclosure controller 804 code repair daemon 1051 performs code failure detection, notification, and repair steps on the enclosure controller 804 code copies in the FLASH memory 1002 and RAM 1004 similar to those performed by the RAID controller 100 processor 108 described above with respect to blocks 602 through 669 and 682 through 686; however, for the sake of brevity, these blocks are not repeated in FIG. 12.

As shown in FIG. 12, flow proceeds from block 669 to block 1272.

At block 1272, the code repair daemon 1051 performs a CRC check of the primary power supply code 1017A. Flow proceeds to decision block 1273.

At decision block 1273, the code repair daemon 1051 determines whether the CRC check performed at block 1272 failed. If so, flow proceeds to block 1274; otherwise, flow proceeds to block 1276.

At block 1274, the code repair daemon 1051 logs an informational event to the event logs 742 and updates the power supply primary failure count 732 to indicate that a failure of the primary power supply code 1017A has been detected. Additionally, if the power supply primary failure count 732 has reached a user-programmable threshold, the code repair daemon 1051 displays a warning message to the user via a user interface. Flow proceeds to block 1275.

At block 1275, the code repair daemon 1051 repairs the primary power supply code 1017A using the secondary power supply code 1017B. Flow proceeds to block 1276.

At block 1276, the code repair daemon 1051 performs a CRC check of the secondary power supply code 1017B. Flow proceeds to decision block 1277.

At decision block 1277, the code repair daemon 1051 determines whether the CRC check performed at block 1276 failed. If so, flow proceeds to block 1278; otherwise, flow proceeds to block 682.

At block 1278, the code repair daemon 1051 logs an informational event to the event logs 742 and updates the power supply secondary failure count 734 to indicate that a failure of the secondary power supply code 1017B has been detected. Additionally, if the power supply secondary failure count 734 has reached a user-programmable threshold, the code repair daemon 1051 displays a warning message to the user via a user interface. Flow proceeds to block 1279.

At block 1279, the code repair daemon 1051 repairs the secondary power supply code 1017B using the primary power supply code 1017A. Flow proceeds to block 682.

Although the present invention and its objects, features, and advantages have been described in detail, other embodiments are encompassed by the invention. For example, although embodiments have been described in which the storage controller is a RAID controller, the apparatus and method described herein may also be employed in any storage controller that has a FLASH memory for storing programs that must be booted therefrom. In addition, although embodiments have been described having two copies of the stored program, the invention may be expanded to more than two copies of the stored program to provide increased fault-tolerance. In this embodiment, the control and status registers are expanded to accommodate the multiple copies such that the selection logic attempts to boot the program copies in turn until a good copy boots. Still further, although two embodiments have been described having a single FLASH memory device and three FLASH memory devices, respectively, other embodiments with different numbers of FLASH memory devices are contemplated. For example, one embodiment is contemplated in which the controller comprises two FLASH memories each storing a copy of the loader program and the application program. For another example, an embodiment is contemplated in which the controller comprises N FLASH memories each storing a copy of the loader program and the application program, where N is greater than two, for providing a higher level of fault-tolerance than having duplicate copies provides. Furthermore, although embodiments have been described in which particular sizes and types of FLASH memories are employed, the apparatus and method described herein may be employed for various sizes and types of non-volatile memories employed to store programs in a storage controller. For example, multiple FLASH memory devices may be grouped together to provide the necessary data path width that is longer than the data output width of a single FLASH device.

In an alternate contemplated embodiment, the controller 100 includes a mechanical or electrical switch that a human may manually flip if the controller 100 fails to boot. The switch serves essentially the same function as the selection logic 142 and the human serves essentially the same function as the timer 106. The human resets the controller 100 after flipping the switch, which causes the controller 100 to attempt to boot from the other copy of the stored programs. This embodiment has the disadvantage that it requires the human to open the controller 100 enclosure in order to flip the switch, which is prone to human error, and may require too much time, particularly for the human to detect that the controller 100 has failed to boot the first time. Additionally, it may be required that the human is a relatively highly trained person, such as a field engineer, who must be on-site in order to avoid the controller being failed for an unacceptable period.

In another alternate contemplated embodiment, the timer 106 function is performed by the microprocessor 108, such as via a combination of a timer built-in to the microprocessor 108 itself and software, such as an operating system, executing on the microprocessor 108 to service the built-in timer, which preferably generates a very high priority interrupt or a non-maskable interrupt. If the timer expires, the loader program flips a switch, such as the switch mentioned above, and resets the controller so that the controller attempts to boot from the other copy of the stored programs. This embodiment has the disadvantage that it requires at least some portion of the loader program to execute properly; in particular, it requires at least the FLASH sectors that are storing the reset vector and portion of loader program that initializes and services the timer to be good. A further disadvantage is that the timer will not work if the entire FLASH memory device is bad.

Additionally, although embodiments are described in which the FLASH memories store copies of boot loader code, application code, FPGA code, CPLD code, and power supply code, the invention is not limited to these applications, but rather may be employed to detect and repair failures for other types of program code. Furthermore, although embodiments are described that employ CRC checks to detect failures of program copies, other methods may be employed to detect failures so that the failed copy may be repaired from a good copy. Furthermore, although embodiments have been described in which a failed copy is repaired by copying the entire good copy to the failed copy location, other embodiments are contemplated, such as comparing the failed and good copies and only programming the non-volatile memory with program bytes that miscompare, which may have the advantage of repairing the failed copy in a shorter time. Finally, although embodiments have been described in which the processors have a particular instruction set architecture, such as an x86 architecture, other embodiments are contemplated in which the processors have different instruction set architectures.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A RAID system, comprising:
   a non-volatile memory, configured to store a first program and first and second versions of a second program and a third program, wherein the first and second versions of the second program are different;
   a volatile memory;
   a watch dog timer, for detecting a failure during a boot process of the RAID system, the watch dog timer having a predetermined maximum timeout period, wherein the boot process is normally longer than said predetermined maximum timeout period of said watch dog timer; and
   a processor, coupled to said non-volatile memory and to said volatile memory and to said watch dog timer, configured to execute said first program, wherein said first program is configured to:
   detect said first version of said second program is failed; and
   repair said failed first version of said second program in said non-volatile memory using said second version of said second program;
   wherein said second program comprises an application program for performing RAID control functions;
   wherein said third program is configured to decompress said first program stored in said non-volatile memory to a decompressed form and to write said decompressed form to said volatile memory during the boot process, wherein said third program is further configured to disable the watch dog timer after writing said decompressed form of said first program to said volatile memory, wherein said third program is further configured to re-enable the watch dog timer prior to said processor executing said first program.

2. The RAID system as recited in claim 1, wherein said non-volatile memory comprises a FLASH memory.

3. The RAID system as recited in claim 1, further comprising:
   a second non-volatile memory, coupled to said processor;
   wherein said second version of said second program is stored in said second non-volatile memory rather than said first non-volatile memory, wherein said first program is configured to repair said failed first version of said second program in said first non-volatile memory using said second version of said second program in said second non-volatile memory.

4. The RAID system as recited in claim 1, wherein said first program is configured to detect said first version of said second program is failed by generating a first cyclic redundancy code (CRC) value of said first version of said second program and determining that said first CRC value mismatches a second CRC value of said first version of said second program.

5. The RAID system as recited in claim 4, wherein said second CRC value is previously generated and stored in said non-volatile memory when said first version of said second program is programmed into said non-volatile memory.

6. The RAID system as recited in claim 1, further comprising:
   a non-volatile indication of whether said first version of said second program failed during initialization of the RAID controller, coupled to said processor;
   wherein said first program is configured to detect said first version of said second program is failed by examining said non-volatile indication.

7. The RAID system as recited in claim 6, further comprising:
   a watchdog timer, coupled to said non-volatile indication, configured to populate said non-volatile indication based on whether said first version of said second program failed to boot within a predetermined time during initialization of the RAID controller, wherein said watchdog timer resets the processor after populating the non-volatile indication.

8. The RAID system as recited in claim 1, wherein said second program comprises a loader program for loading an application program for execution by the processor.

9. The RAID system as recited in claim 8, further comprising:
   a volatile memory, coupled to said processor, wherein said loader program is configured to load said application program from said non-volatile memory into said volatile memory for execution by the processor.

10. The RAID system as recited in claim 9, wherein said first program is further configured to detect said application program in said volatile memory is failed by performing a CRC check of said application program in said volatile memory.

11. The RAID system as recited in claim 10, wherein said first program is further configured to reboot said processor in response to detecting said application program in said volatile memory is failed.

12. The RAID system as recited in claim 11, wherein said first program is further configured to failover to a redundant controller of the RAID system prior to rebooting said processor.

13. The RAID system as recited in claim 1, wherein said second program comprises an application program for managing a RAID controller.

14. The RAID system as recited in claim 1, wherein said second program comprises an application program for monitoring and controlling an enclosure of the RAID system.

15. The RAID system as recited in claim 1, further comprising:
a field-programmable gate array (FPGA), coupled to said processor, wherein said second program comprises code for programming said FPGA.

16. The RAID system as recited in claim 1, further comprising:
a complex programmable logic device (CPLD), coupled to said processor, wherein said second program comprises code for programming said CPLD.

17. The RAID system as recited in claim 1, further comprising:
a power supply, coupled to provide power to said processor and said non-volatile memory, said power supply comprising a processor for executing said second program.

18. The RAID system as recited in claim 1, wherein said first version of said second program is at a first location in said non-volatile memory and said second version of said second program is at a second location in said non-volatile memory, wherein said first program is configured to copy said second version of said second program from said second location to said first location in said non-volatile memory to repair said failed first version of said second program in said non-volatile memory.

19. The RAID system as recited in claim 18, wherein said first program copies said second version of said second program from said second location to said first location in said non-volatile memory by reading said second version of said second program from said second location in said non-volatile memory and writing said second version of said second program read from said second location to said first location in said non-volatile memory.

20. The RAID system as recited in claim 18, further comprising:
a volatile memory, coupled to said processor;
wherein said first program copies said second version of said second program from said second location to said first location in said non-volatile memory via a temporary location in said volatile memory, wherein no modification is performed on said second version of said second program in said temporary location.

21. The RAID system as recited in claim 1, wherein said first program is further configured to notify a user that said first version of said second program is failed.

22. The RAID system as recited in claim 1, wherein said first program is further configured to update a count of a number of failures of said first version of said second program in response to detecting said first version of said second program is failed.

23. The RAID system as recited in claim 22, wherein said first program is further configured to notify a user that said first version of said second program is failed if said count exceeds a user-programmable threshold.

24. The RAID system as recited in claim 1, wherein said first program is further configured to log in said non-volatile memory an event specifying that said first version of said second program is failed.

25. A method for improving the data availability characteristics of a RAID system, comprising:
executing a first program on a processor of the RAID system;
detecting, by the first program, that a first version of a second program is failed, wherein said first version of said second program is stored in a non-volatile memory of the RAID system;
repairing, by the first program, said failed first version of said second program in said non-volatile memory using a second version of said second program stored in said non-volatile memory, wherein the first and second versions of the second program are different;
decompressing the first program to a decompressed form and writing the decompressed form to a volatile memory of the RAID system during a boot process of the RAID system; and
disabling a watch dog timer of the RAID system after writing the decompressed form of the first program to the volatile memory, wherein the watch dog timer is configured to detect a failure during the boot process, wherein the watch dog timer has a predetermined maximum timeout period, wherein the boot process is normally longer than the predetermined maximum timeout period of the watch dog timer; and
re-enabling the watch dog timer of the RAID system prior to executing the first program on the processor;
wherein said decompressing, said writing, and said disabling and then re-enabling are performed by a third program stored in the non-volatile memory;
wherein said second program comprises an application program for performing RAID control functions.

26. The method as recited in claim 25, wherein said non-volatile memory comprises a FLASH memory.

27. The method as recited in claim 25, wherein said second version of said second program is stored in a second non-volatile memory of the RAID system rather than said first non-volatile memory, wherein said repairing comprises repairing said failed first version of said second program in said first non-volatile memory using said second version of said second program in said second non-volatile memory.

28. The method as recited in claim 25, wherein said detecting said first version of said second program is failed comprises:
generating a first cyclic redundancy code (CRC) value of said first version of said second program; and
determining that said first CRC value mismatches a second CRC value of said first version of said second program.

29. The method as recited in claim 28, wherein said second CRC value is previously generated and stored in said non-volatile memory when said first version of said second program is programmed into said non-volatile memory.

30. The method as recited in claim 25, further comprising:
storing a non-volatile indication of whether said first version of said second program failed during initialization of the RAID controller;
wherein said detecting comprises examining said non-volatile indication and determining therefrom that said first version of said second program failed during initialization of the RAID controller.

31. The method as recited in claim 30, further comprising:
populating, by a watchdog timer, said non-volatile indication based on whether said first version of said second program failed to boot within a predetermined time during initialization of the RAID controller, wherein said watchdog timer resets the processor after populating the non-volatile indication.

32. The method as recited in claim 25, wherein said second program comprises a loader program for loading an application program for execution by the processor.

33. The method as recited in claim 32, further comprising:
loading, by said loader program, said application program from said non-volatile memory into a volatile memory of the RAID system for execution by the processor.

34. The method as recited in claim 33, further comprising: detecting said application program in said volatile memory is failed by performing a CRC check of said application program in said volatile memory.

35. The method as recited in claim 34, further comprising: rebooting said processor in response to said detecting said application program in said volatile memory is failed.

36. The method as recited in claim 35, further comprising: failing over to a redundant controller of the RAID system prior to said rebooting said processor.

37. The method as recited in claim 25, wherein said second program comprises an application program for managing a RAID controller.

38. The method as recited in claim 25, wherein said second program comprises an application program for monitoring and controlling an enclosure of the RAID system.

39. The method as recited in claim 25, wherein said second program comprises code for programming a field-programmable gate array (FPGA).

40. The method as recited in claim 25, wherein said second program comprises code for programming a complex programmable logic device (CPLD).

41. The method as recited in claim 25, wherein said second program comprises code for execution by a power supply coupled to provide power to the RAID system.

42. The method as recited in claim 25, wherein said first version of said second program is at a first location in said non-volatile memory and said second version of said second program is at a second location in said non-volatile memory, wherein said repairing comprises:
copying said second version of said second program from said second location to said first location in said non-volatile memory.

43. The method as recited in claim 42, wherein said copying comprises:
reading said second version of said second program from said second location in said non-volatile memory; and
writing said second version of said second program read from said second location to said first location in said non-volatile memory.

44. The method as recited in claim 42, wherein said copying is performed via a temporary location in a volatile memory of the RAID system, wherein no modification is performed on said second version of said second program in said temporary location.

45. The method as recited in claim 25, further comprising: notifying a user that said first version of said second program is failed, in response to said detecting.

46. The method as recited in claim 25, further comprising: updating a count of a number of failures of said first version of said second program in response to said detecting said first version of said second program is failed.

47. The method as recited in claim 46, further comprising: notifying a user that said first version of said second program is failed if said count exceeds a user-programmable threshold.

48. The method as recited in claim 25, further comprising: logging in said non-volatile memory an event specifying that said first version of said second program is failed.

49. A RAID system, comprising:
a first controller, comprising:
a first non-volatile memory, configured to store a first program and first and second versions of a second program and a fifth program, wherein the first and second versions of the second program are different;
a first volatile memory;
a first watch dog timer, for detecting a failure during a boot process of the first controller, the first watch dog timer having a predetermined maximum timeout period, wherein the boot process of the first controller is normally longer than said predetermined maximum timeout period of said first watch dog timer; and
a first processor, coupled to said first non-volatile memory and to said first volatile memory and to said first watch dog timer, configured to execute said first program, wherein said first program is configured to:
detect said first version of said second program is failed; and
repair said failed first version of said second program in said first non-volatile memory using said second version of said second program;
wherein said fifth program is configured to decompress said first program stored in said first non-volatile memory to a decompressed form and to write said decompressed form to said first volatile memory during the boot process of the first controller, wherein said fifth program is further configured to disable the first watch dog timer after writing said decompressed form of said first program to said first volatile memory, wherein said fifth program is further configured to re-enable the first watch dog timer prior to said first processor executing said first program; and
a second controller, coupled to said first controller, comprising:
a second non-volatile memory, configured to store a third program and first and second versions of a fourth program and a sixth program, wherein the first and second versions of the fourth program are different;
a second volatile memory;
a second watch dog timer, for detecting a failure during a boot process of the second controller, the second watch dog timer having a predetermined maximum timeout period, wherein the boot process of the second controller is normally longer than said predetermined maximum timeout period of said second watch dog timer; and
a second processor, coupled to said second non-volatile memory and to said second volatile memory and to said second watch dog timer, configured to execute said third program, wherein said third program is configured to:
detect said first version of said fourth program is failed; and
repair said failed first version of said fourth program in said second non-volatile memory using said second version of said fourth program;
wherein said sixth program is configured to decompress said first program stored in said second non-volatile memory to a decompressed form and to write said decompressed form to said second volatile memory during the boot process of the second controller, wherein said sixth program is further configured to disable the second watch dog timer after writing said decompressed form of said first program to said second volatile memory, wherein said sixth program is further configured to re-enable the second watch dog timer prior to said second processor executing said third program;
wherein said second program comprises an application program for performing RAID control functions.

50. The RAID system as recited in claim 49, wherein said second program comprises program code for programming an FPGA.

51. The RAID system as recited in claim 49, wherein said second program comprises program code for programming a CPLD.

52. The RAID system as recited in claim 49, wherein said second program comprises a program for execution by a power supply microcontroller.

53. The RAID system as recited in claim 49, wherein said first controller comprises a RAID controller, wherein said second controller comprises a management controller for providing a management interface to a user for managing the RAID system.

54. The RAID system as recited in claim 49, wherein said first controller comprises a RAID controller, wherein said second controller comprises an enclosure controller for monitoring and controlling components of an enclosure of the RAID system.

55. The RAID system as recited in claim 49, further comprising:
  a third controller, coupled to said first and second controllers, comprising:
    a third non-volatile memory, configured to store a fifth program and first and second versions of a sixth program, wherein the first and second versions of the sixth program are different;
    a third processor, coupled to said second non-volatile memory, configured to execute said fifth program, wherein said fifth program is configured to:
      detect said first version of said sixth program is failed; and
      repair said failed first version of said sixth program in said third non-volatile memory using said second version of said sixth program.

* * * * *